United States Patent
Sato et al.

(10) Patent No.: US 7,570,283 B2
(45) Date of Patent: Aug. 4, 2009

(54) IMAGE CAPTURING SYSTEM HAVING AN IMAGE CAPTURING RESTRICTION FUNCTION

(75) Inventors: Satoshi Sato, Neyagawa (JP); Katsuji Aoki, Nara (JP); Kunio Nobori, Kadoma (JP); Jun Ozawa, Nara (JP); Taro Imagawa, Hirakata (JP)

(73) Assignee: Panasonic Corporation, Osaka (JP)

( * ) Notice: Subject to any disclaimer, the term of this patent is extended or adjusted under 35 U.S.C. 154(b) by 549 days.

(21) Appl. No.: 11/247,178

(22) Filed: Oct. 12, 2005

(65) Prior Publication Data

US 2006/0028558 A1    Feb. 9, 2006

Related U.S. Application Data

(63) Continuation of application No. PCT/JP2004/006873, filed on May 14, 2004.

(30) Foreign Application Priority Data

May 20, 2003  (JP)  ............................. 2003-142668

(51) Int. Cl.
*H04N 5/232* (2006.01)
*H04N 5/222* (2006.01)
(52) U.S. Cl. ............. 348/211.4; 348/211.2; 348/333.12
(58) Field of Classification Search ............. 348/207.1, 348/207.11, 211.99, 211.2, 211.4, 211.9, 348/211.6, 211.7, 239, 333.04, 333.12
See application file for complete search history.

(56) References Cited

U.S. PATENT DOCUMENTS

| | | | | |
|---|---|---|---|---|
| 6,055,014 | A * | 4/2000 | Hosonuma et al. | 348/211.9 |
| 6,067,399 | A * | 5/2000 | Berger | 386/46 |
| 6,738,572 | B2 * | 5/2004 | Hunter | 396/56 |
| 6,801,642 | B2 * | 10/2004 | Gorday et al. | 382/118 |
| 7,092,568 | B2 * | 8/2006 | Eaton | 382/181 |
| 7,110,666 | B2 * | 9/2006 | Abe et al. | 396/59 |
| 7,272,240 | B2 * | 9/2007 | Goldberg et al. | 382/100 |
| 2001/0024233 | A1 * | 9/2001 | Urisaka et al. | 348/213 |
| 2002/0039479 | A1 | 4/2002 | Watanabe et al. | |
| 2002/0076217 | A1 * | 6/2002 | Rodriguez et al. | 396/72 |
| 2004/0046871 | A1 * | 3/2004 | Ichikawa et al. | 348/207.99 |
| 2004/0174435 | A1 * | 9/2004 | Kondoh | 348/211.99 |
| 2004/0202382 | A1 * | 10/2004 | Pilu | 382/276 |
| 2005/0007456 | A1 * | 1/2005 | Lee et al. | 348/207.99 |

(Continued)

FOREIGN PATENT DOCUMENTS

EP    1 381 234    1/2004

(Continued)

*Primary Examiner*—John M Villecco
(74) *Attorney, Agent, or Firm*—Wenderoth, Lind & Ponack, L.L.P.

(57) ABSTRACT

An image capturing apparatus (100) of an image taker side has an image capturing unit (101) which captures an image using a CCD sensor, a CMOS sensor and the like, an image capturing restriction signal receiving unit (102) which receives an image capturing restriction signal transmitted by a communication terminal (200), and an image capturing restriction unit (103) which restricts the image capturing performed by the image capturing unit (101) according to a request of the image capturing restriction signal. Further, the communication terminal (200) of a subject side has an image capturing restriction signal generation unit (201) which transmits the image capturing restriction signal for requesting to restrict the image capturing.

17 Claims, 22 Drawing Sheets

U.S. PATENT DOCUMENTS

| | | | |
|---|---|---|---|
| 2005/0093980 A1* | 5/2005 | Nonaka et al. | 348/207.99 |
| 2005/0134696 A1* | 6/2005 | Nath et al. | 348/211.9 |
| 2005/0281548 A1* | 12/2005 | Suh et al. | 396/56 |
| 2005/0285944 A1* | 12/2005 | Watanabe et al. | 348/207.1 |
| 2005/0286879 A1* | 12/2005 | Nakaya | 396/56 |
| 2006/0140475 A1* | 6/2006 | Chin et al. | 382/164 |
| 2008/0020732 A1* | 1/2008 | Wu | 348/211.2 |
| 2008/0030588 A1* | 2/2008 | Boss et al. | 348/211.2 |
| 2009/0033756 A1* | 2/2009 | Kamatani et al. | 348/222.1 |

FOREIGN PATENT DOCUMENTS

| | | | |
|---|---|---|---|
| JP | 2000-152217 | | 5/2000 |
| JP | 2000228741 A | * | 8/2000 |
| JP | 2000-278584 | | 10/2000 |
| JP | 20014-169175 | | 6/2001 |
| JP | 2001169175 A | * | 6/2001 |
| JP | 2001313006 A | * | 11/2001 |
| JP | 2002135838 A | * | 5/2002 |
| JP | 2002-374444 | | 12/2002 |
| JP | 2003-078810 | | 3/2003 |
| JP | 2003087632 A | * | 3/2003 |
| JP | 2003087637 A | * | 3/2003 |
| JP | 2004-023692 | | 1/2004 |
| JP | 2004-056769 | | 2/2004 |
| JP | 2004-088273 | | 3/2004 |
| JP | 2004-153324 | | 5/2004 |

* cited by examiner

Capturing prospective picture

Capturing-prohibited region

Captured picture

Capturing prospective picture

Capturing-prohibited region

Background picture

Captured picture

Restriction side      Image subject side

Capturing prospective picture

Encrypted capturing prospective picture

Picture decrypted by subject G031

Picture decrypted by subject G032

Captured picture

IMAGE CAPTURING SYSTEM HAVING AN IMAGE CAPTURING RESTRICTION FUNCTION

CROSS REFERENCE TO RELATED APPLICATION

This is a Continuation Application of International Application No. PCT/JP2004/006873, filed May 14, 2004.

TECHNICAL FIELD

The present invention relates to an image capturing apparatus having an image sensor, for example, such as a CCD sensor, and to an image capturing system in which a communication terminal that communicates with the image capturing apparatus restricts an image capturing performed by the image capturing apparatus.

BACKGROUND ART

In recent years, along with a miniaturization, weight reduction and lowering prices of an image capturing apparatus such as a digital camera, a still camera and a video camera, the image capturing apparatus has been equipped to various appliances such as a cellular phone, a laptop computer, a Personal Digital Assist (PDA) and a wearable display. In particular, a camera-equipped cellular phone has been rapidly available for use because of the miniaturization, portability and convenience that an image can be sent for communication on the spot where the image is captured.

While such camera-equipped appliance allows a user to capture an image easily at anytime and anywhere, there is a problem of invasion of privacy that a person to be a subject of an image capturing is captured without noticing that his/her image is being captured. Also, there is a problem that, even in a region where photographing is prohibited such as in a museum, an unauthorized image capturing can be performed easily without being noticed by anyone because of the portability.

In order to solve the problems, various measures have been taken using conventional technologies. For example, there is an invention that a tally light which generates light from a light source and which has passed a color filter is set in a camera-equipped portable terminal and the tally light is turned on when the camera starts capturing an image so that the subject can recognize that his/her image has been captured (e.g. refer to Japanese Laid-Open Patent Application No. 2002-374444). Also, there is an image capturing apparatus which has an unauthorized image capturing prevention information detection unit outputting an unauthorized image capturing prevention signal which turns off an image capturing function when an unauthorized image capturing prevention information generation apparatus detects unauthorized image capturing prevention information having predetermined features (e.g. shape, and flashing pattern) from an image signal obtained from the captured image. Therefore, the subject carries the unauthorized image capturing prevention information generation apparatus so as to prevent the unauthorized image capturing (e.g. refer to Japanese Laid-Open Patent Application No. 2001-169175). Also, a current camera-equipped portable terminal is designed to prevent an unauthorized image capturing by making sound for notifying photographing when an image is captured.

However, the method disclosed in Japanese Patent Publication No. 2002-374444 and the current widely used method of notifying photographing with sound cannot prevent capturing an image of a subject from a distant location using a telephoto lens, an electronic zoom and the like. Further, these methods emit light or make sound every time when an image is captured. Therefore, they cause an inconvenience to people around an image taker when the image capturing is authorized.

In addition, the method disclosed in Japanese Laid-Open Patent Application No. 2001-169175 uses whether unauthorized image capturing prevention information such as a predetermined shape and a flashing pattern is included in the captured picture. However, it is not certain whether such unauthorized image capturing prevention information is captured depending on the condition therein. For example, assuming a case where a subject equips an unauthorized image capturing apparatus on the chest. Herein, in the case where the subject is captured at a moment when the subject is about to look back, the face of the subject is shown in the captured picture. However, the unauthorized image capturing prevention information is not shown so that the unauthorized image capturing cannot be prevented.

DISCLOSURE OF INVENTION

Accordingly, concerning the above circumstances, an object of the present invention is to provide an image capturing system and an image capturing apparatus which can prevent the subject from being captured without permissions and not to bother the neighbors.

In order to achieve the aforementioned object, an image capturing system according to the present invention is an image capturing system including: an image capturing apparatus; and a communication terminal which communicates with the image capturing apparatus, wherein the image capturing apparatus includes: an image capturing notification signal generation unit which transmits an image capturing notification signal for notifying the communication terminal that an image capturing is to be performed; an image capturing restriction signal receiving unit which receives an image capturing restriction signal transmitted by the communication terminal; and an image capturing restriction unit which restricts the image capturing based on the image capturing restriction signal received by the image capturing restriction signal receiving unit, and the communication terminal includes: an image capturing notification signal receiving unit which receives the image capturing notification signal transmitted by the image capturing notification signal receiving unit; and an image capturing restriction signal generation unit which transmits the image capturing restriction signal for restricting the image capturing performed by the image capturing apparatus, based on the image capturing notification signal received by the image capturing notification signal receiving unit.

Also, an image capturing system according to the present invention is an image capturing system including: an image capturing apparatus; and a communication terminal which communicates with the image capturing apparatus, wherein the communication terminal includes an image capturing restriction signal generation unit which attaches information relating to a subject to be captured to an image capturing restriction signal for restricting an image capturing performed by the image capturing apparatus, and transmits the image capturing restriction signal attached with the information, the subject carrying the communication terminal, and the image capturing apparatus includes: an image capturing restriction signal receiving unit which receives the image capturing restriction signal transmitted by the image capturing restriction signal generation unit; and an image capturing restriction unit which judges whether or not the subject carrying the communication terminal is included in an image capturing area of the image capturing apparatus based on the information attached to the image capturing restriction signal received by the image capturing restriction signal receiving unit, and restricts the image capturing based on the image capturing restriction signal in the case where the subject is included in the image capturing area.

Further, an image capturing system according to the present invention is an image capturing system including: an image capturing apparatus; and a communication terminal which communicates with the image capturing apparatus, wherein the communication terminal includes an image capturing restriction signal generation unit which transmits an image capturing restriction signal for requesting not to capture a subject carrying the communication terminal, and the image capturing apparatus includes: an image capturing restriction signal receiving unit which receives the image capturing restriction signal transmitted by the image capturing restriction signal generation unit; and an image capturing restriction unit which performs one of the following: deleting a subject region in a captured picture; and replacing the subject region with another image based on the image capturing restriction signal received by the image capturing restriction signal receiving unit.

Additionally, an image capturing system according to the present invention is an image capturing system including: an image capturing apparatus; and a communication terminal which communicates with the image capturing apparatus, wherein the communication terminal includes an image capturing restriction signal generation unit which transmits an image capturing restriction signal for requesting to capture only an image of a subject carrying the communication terminal and does not capture an image of background of the subject, and the image capturing apparatus includes: an image capturing restriction signal receiving unit which receives the image capturing restriction signal transmitted by the image capturing restriction signal generation unit; and an image capturing restriction unit which performs one of the following: deleting a background region in a captured picture; and replacing the background region with another image, based on the image capturing restriction signal received by the image capturing restriction signal receiving unit.

Furthermore, an image capturing system according to the present invention is an image capturing system including: an image capturing apparatus; and a communication terminal which communicates with the image capturing apparatus, wherein the communication terminal includes an image capturing restriction signal generation unit which transmits an image capturing restriction signal for restricting an image capturing performed by the image capturing apparatus, and the image capturing apparatus includes: an image capturing restriction signal receiving unit which receives the image capturing restriction signal transmitted by the image capturing restriction signal generation unit, and estimates a position of a subject to be captured based on the image capturing restriction signal, the subject carrying said communication terminal; and an image capturing restriction unit which restricts the image capturing based on the image capturing restriction signal received by the image capturing restriction signal receiving unit.

As is clear from the above explanation, the image capturing system according to the present invention, when an image capturing is performed, can verify whether or not the communication terminal of the subject allows capturing an image, and restricts the captured picture in accordance with the result. Therefore, it can protect the privacy of the subject and prevent the unauthorized image capturing.

Accordingly, its practical value is very high today in which the image capturing apparatus such as a camera-equipped telephone which can communicate an image on the spot where the image is captured has been rapidly available because of the portability and usability.

BEST MODE FOR CARRYING OUT THE INVENTION

Figure 1:
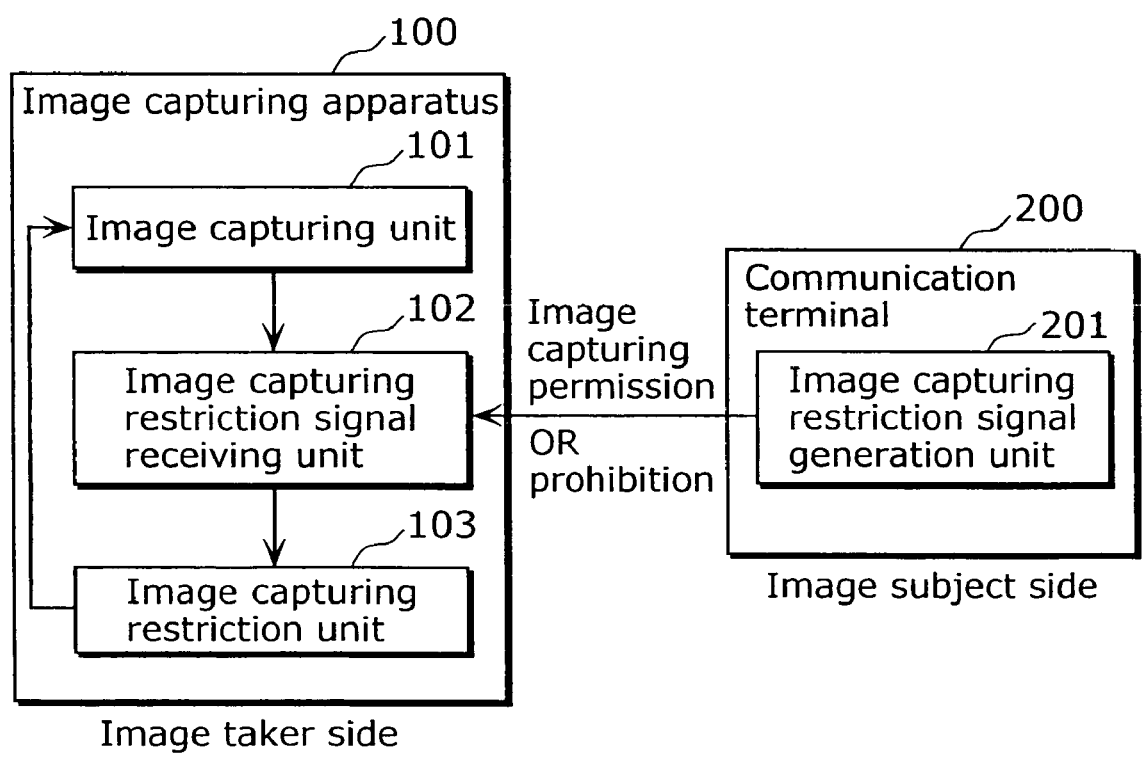
FIG. 1 is a block diagram showing a structure of an image capturing system according to a first embodiment of the present invention.

The image capturing system according to embodiments of the present invention is an image capturing system including: an image capturing apparatus; and a communication terminal which communicates with the image capturing apparatus, wherein the communication terminal includes an image capturing restriction signal generation unit which transmits an image capturing restriction signal for restricting an image capturing performed by said image capturing apparatus, and the image capturing apparatus includes: an image capturing restriction signal receiving unit which receives the image capturing restriction signal transmitted by the image capturing restriction signal generation unit; and an image capturing restriction unit restricts the image capturing based on the image capturing restriction signal received by the image capturing restriction signal receiving unit.

Consequently, the unauthorized image capturing can be prevented because the image capturing apparatus can perform capturing of an image only after verifying whether or not the communication terminal of the subject allows capturing of the image when the image is captured and under a condition where the communication terminal of the subject allows capturing the image.

Here, the image capturing apparatus further includes an image capturing notification signal generation unit which transmits an image capturing notification signal for notifying the communication terminal that the image capturing is to be performed, the communication terminal further includes an image capturing notification signal receiving unit which receives the image capturing notification signal transmitted by the image capturing notification signal generation unit, and the image capturing restriction signal generation unit transmits the image capturing restriction signal based on the image capturing notification signal received by the image capturing notification signal receiving unit.

Consequently, the communication terminal of the subject side may transmit the imaging restriction signal only in the case of receiving the image capturing notification signal from the image capturing apparatus. Also, the communication terminal can change the image capturing restriction signal in accordance with the image capturing notification signal.

Here, the image capturing apparatus further includes: a subject information receiving unit which receives subject information that is information about a subject to be captured, and that is transmitted by the communication terminal carried by the subject; and an image capturing information generation unit which transmits, to the communication terminal, image capturing information for judging whether or not the subject carrying the communication terminal allows an image capturing based on the subject information received by the subject information receiving unit, the communication terminal further includes: a subject information generation unit which transmits, to the image capturing apparatus, the subject information based on the image capturing notification signal received by the image capturing notification signal receiving unit; and an image capturing information receiving unit which receives the image capturing information transmitted by the image capturing information generation unit, and the image capturing restriction signal generation unit transmits the image capturing restriction signal based on the image capturing information received by the image capturing information receiving unit.

Consequently, the communication terminal of the subject side can verify the image capturing information received from the image capturing apparatus and determine whether or not to give a permission to capture the image. Therefore, the unauthorized image capturing can be prevented.

Here, the image capturing restriction signal is a signal for requesting to prohibit the image capturing performed by the image capturing apparatus, and the image capturing restriction unit prohibits the image capturing in the case where the image capturing restriction signal is a signal for requesting to prohibit the image capturing performed by the image capturing apparatus.

Also, the image capturing restriction signal is a signal for requesting not to capture a subject carrying the communication terminal, and the image capturing restriction unit is operable to perform one of the following: deleting a subject region in a captured picture; and replacing the subject region with another image, in the case where the image capturing restriction signal is a signal for requesting not to capture the subject carrying the communication terminal.

Consequently, the communication terminal of the subject can determine restricting an image capturing performed by the image capturing apparatus depending on the necessity. Further, even in the case where the subject does not allow the image capturing, the image taker can obtain an agreeable image without invading privacy of the subject.

Furthermore, it is desired that the image capturing notification signal includes image taker information for specifying the image taker, and that the image capturing restriction signal generation unit judges whether or not to restrict capturing an image based on the image taker information, and transmits the image capturing restriction signal in accordance with the judgment.

Here, the image taker information is identification (ID) information of the image taker, and the image capturing restriction signal generation unit judges whether or not to restrict the image capturing by comparing the ID information of the image taker with pre-registered ID information. Consequently, the communication terminal of the subject can judge whether or not to give permission for an image capturing depending on who the image taker is. Therefore, the unauthorized image capturing can be prevented.

Also, the image taker information is position or direction information of the image capturing apparatus, and the image capturing restriction signal generation unit notifies a subject to be captured of the position or direction information of the image capturing apparatus, the subject carrying the communication terminal. Consequently, the subject can judge whether or not to give permission for an image capturing depending on from where the image taker captures an image. Therefore, the unauthorized image capturing can be prevented.

Here, the image capturing information generation unit may transmit a capturing prospective picture which is likely to be captured as image capturing information. Consequently, the communication terminal of the subject can obtain a capturing prospective picture, and determine whether or not to give permission for an image capturing after verifying the capturing prospective picture. Therefore, the unauthorized image capturing can be prevented.

Here, the subject information generation unit may transmit information for encrypting the image capturing information as subject information, and the image capturing information generation unit may encrypt the capturing prospective picture based on the information for encryption. Consequently, it can prevent the capturing prospective picture to be captured without authorization because the capturing prospective picture can be decoded only by the communication terminal of the subject.

Note that, the present invention can be realized not only as such image capturing system but also as an image capturing method having characteristic units included in the image capturing system as steps, as well as a program for causing a computer to execute those steps. Also, not to mention that such program can be distributed via a recording medium such as CD-ROM and a transmission medium such as the Internet.

Hereafter, each embodiment of the present invention is explained respectively with references to the drawings.

First Embodiment

FIG. 1 is a block diagram showing a structure of an image capturing system according to a first embodiment of the present invention.

The image capturing system is a system for restricting an image capturing apparatus, which captures an image, from capturing the image. Broadly speaking, as shown in FIG. 1, it has an image capturing apparatus 100 that is an image-capturing side and a communication terminal 200 that is a side of a subject to be captured. Hereafter, it is explained that the subject is a person, and carries the communication terminal 200.

As shown in FIG. 1, the image capturing apparatus 100 has an image capturing unit 101, an image capturing restriction signal receiving unit 102, and an image capturing restriction unit 103.

The image capturing unit 101 captures an image using a CCD sensor, a CMOS sensor and the like. The image capturing restriction signal receiving unit 102 detects whether there is an image capturing restriction signal transmitted by the communication terminal 200 of the subject around it when the image capturing apparatus 100 captures an image. When there is the image capturing restriction signal, it receives the signal. It can be detected about whether the image capturing is performed by pressing a shutter of a camera. The image capturing restriction unit 103 thus captures an image after restricting the image capturing performed by the image capturing unit 101 in accordance with a request of the image capturing restriction signal received by the image capturing restriction signal receiving unit 102.

As the image capturing apparatus 100, it only needs to equip a camera which is the image capturing unit 101, such as, of course, a still camera, and a digital video camera, and as a cellular phone and PDA carried by an image taker, a laptop computer, and a wearable terminal. Also, it can be an apparatus using a camera equipped as the image capturing unit 101 to an infrastructure such as in a room, on a street, on a signal and a building.

On the other hand, the communication terminal 200 has an image capturing restriction signal generation unit 201. As the communication terminal 200, it only needs to equip the image capturing restriction signal generation unit 201 to, for example, a mobile terminal, a key chain, a watch and the like.

The image capturing restriction signal generation unit 201 transmits an image capturing restriction signal for requesting to restrict the image capturing. Specifically, the image capturing restriction signal generation unit 201 transmits the following two types of information as image capturing restriction signals using a radio wave in a certain band, for example, infrared radiation and the like in order to request an image capturing apparatus which is about to capture an image, to restrict the image capturing. The first information is restriction information which notifies details of restriction on the image capturing. The second information is subject information for the image capturing apparatus 100 to judge whether there is a subject having the communication terminal 200 in an area to be captured. The details about these types of information are explained later in detail.

Next, an operation of the image capturing system structured as described above is explained. The image capturing restriction performed by the image capturing restriction unit 103 depends on an image capturing restriction signal transmitted by the communication terminal 200, that is, control information and subject information. Therefore, a relationship among them is explained in detail using examples.

FIRST EXAMPLE

In the first example, positional information of a subject is attached as subject information. The positional information can be obtained by a Global Positioning System (GPS) and a detecting function of a base station of a cellular phone and further by using an RF tag. Herein, information such as "photographing is prohibited" may be transmitted as restriction information.

Figure 2:
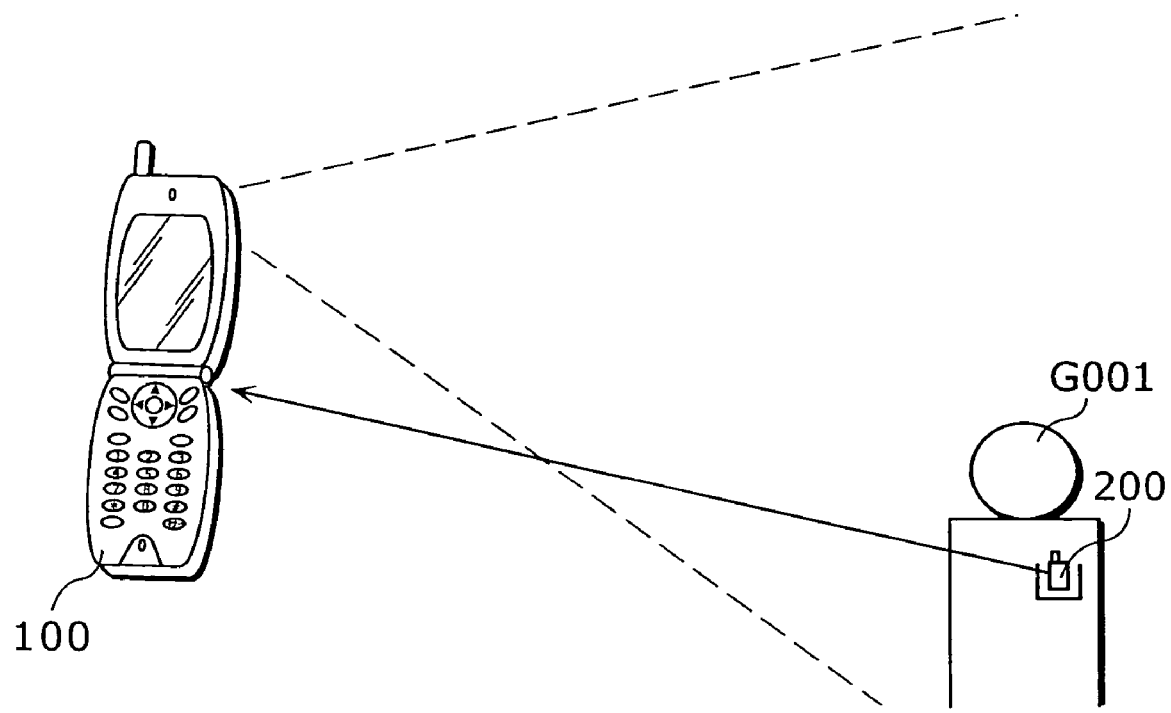
FIG. 2 is a schematic diagram showing a state where an image capturing apparatus according to the present invention captures an image of a subject having a communication terminal.
Figure 3:
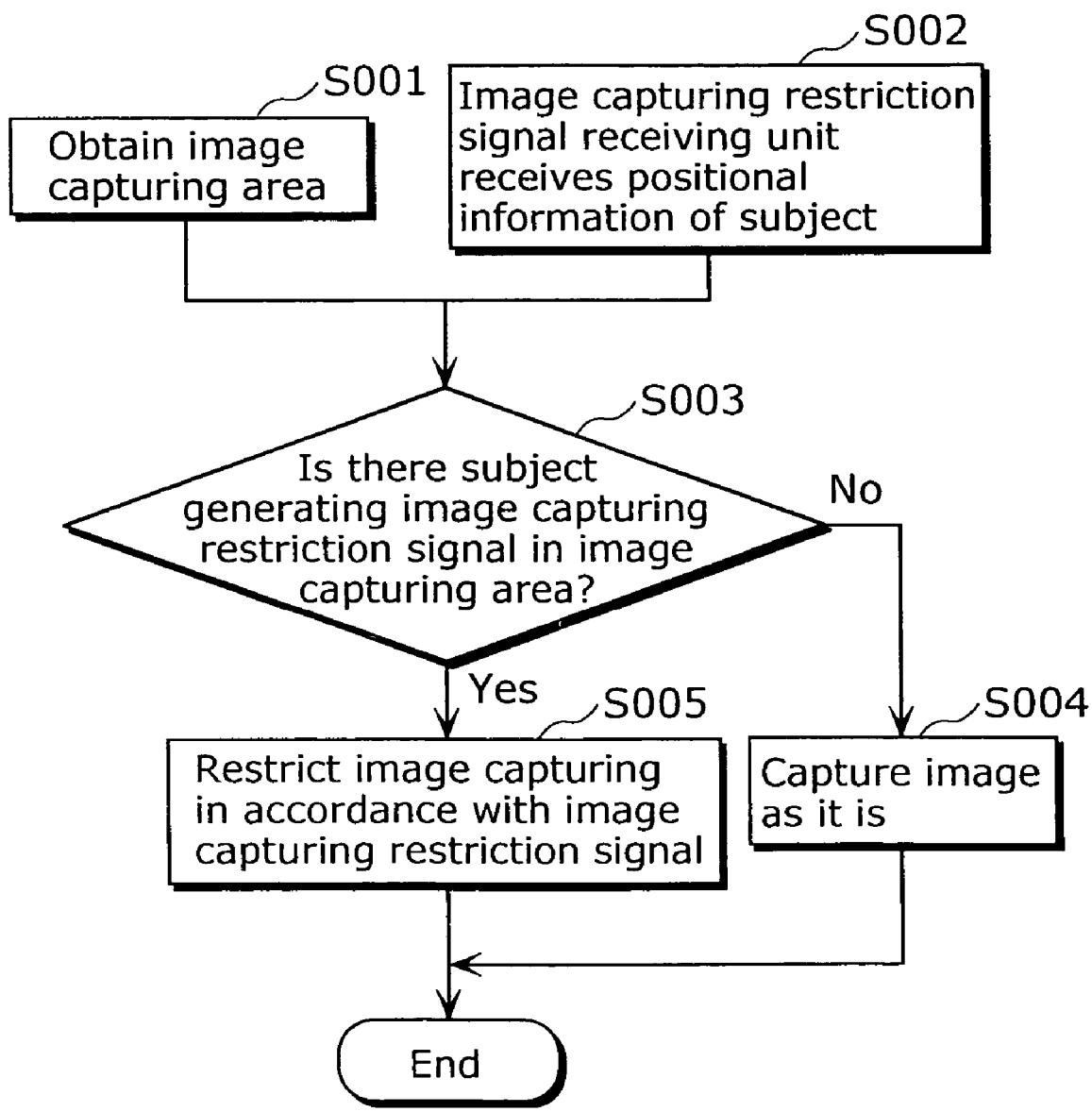
FIG. 3 is a flowchart showing a flow of operations by the image capturing apparatus in the first example of the first embodiment.
Figure 4:
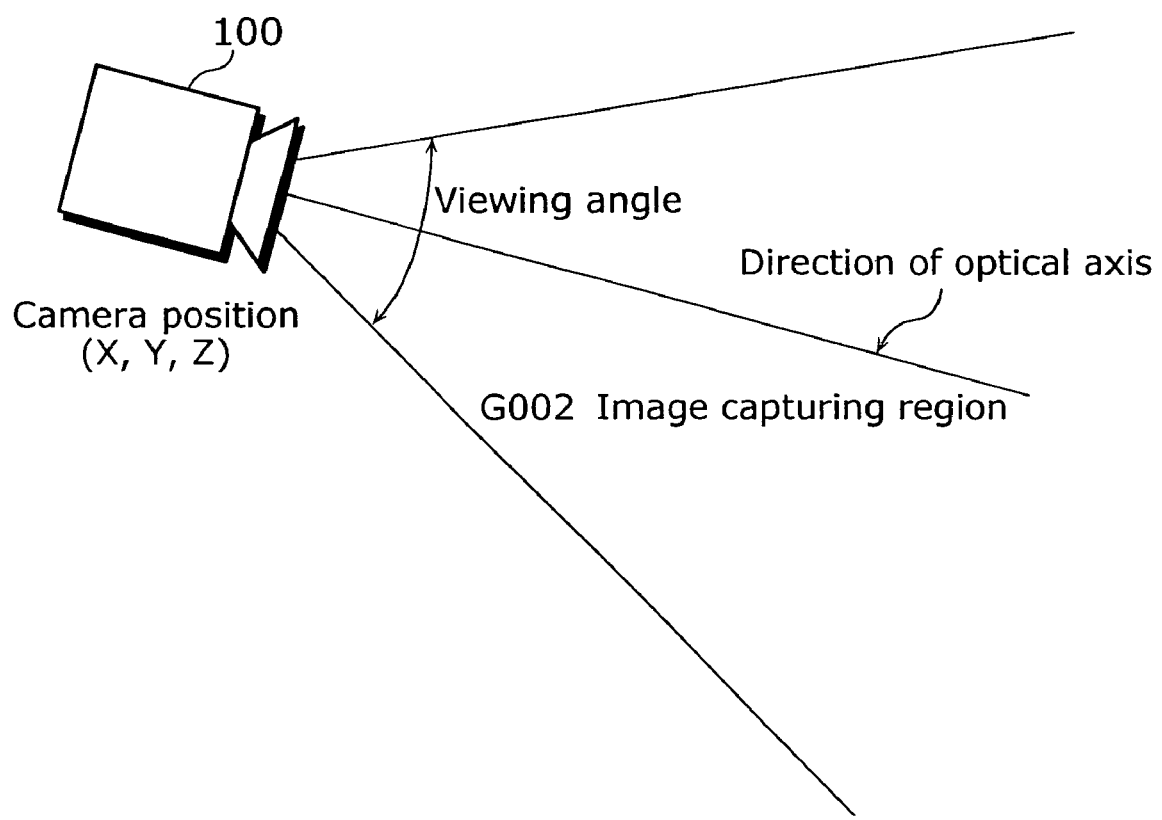
FIG. 4 is a schematic diagram for explaining a relationship between the image capturing apparatus and the image capturing area in the present invention.

FIG. 2 is a schematic diagram showing a state where an image of a subject G001 having the communication terminal 200 is captured by the image capturing apparatus 100 that is a camera-equipped cellular phone. FIG. 3 is a flowchart showing a flow of operations by the image capturing apparatus 100. FIG. 4 is a schematic diagram for explaining a relationship between the image capturing apparatus 100 and an image capturing area.

First, as shown in FIG. 2, when an image taker tries to capture an image of the subject G001 using the image capturing apparatus 100, the image capturing unit 101 obtains an image capturing area to be captured (step S001). As shown in FIG. 4, the image capturing area G002 can be calculated when image capturing information by the image capturing unit 101 such as a position of the image capturing unit 101, a direction of an optical axis of the image capturing unit 101, further, a viewing angle, focal length, focal depth, zoom and the like of the image capturing unit 101 (in FIG. 4, the focal depth, focal length and zoom are omitted). Here, the position of the image capturing unit 101 is obtained using, for example, a GPS, a detection unit of a base station of a cellular phone, and further an RF tag and the like. Note that, the height information of the image capturing unit 101 is difficult to be obtained by the GPS and the like. Therefore, a height sensor using an ultrasonic sensor and the like can be installed. Also, the direction of the optical axis of the image capturing unit 101 is measured, for example, by setting a gyro sensor in the image capturing apparatus 100. Further, the viewing angel, focal length and focal depth of the image capturing apparatus 101 are measured respectively from design data of an image sensor and lens of the image capturing unit 101. The zoom is measured by the image capturing apparatus 100. In addition, not defining all areas in which an image is captured as image capturing areas, but the image capturing area may be exclusive of, for example, an area in which an image of the subject is too far to recognize the image of the subject, an area positioning at an edge of the captured picture where only a part of an image of the subject is captured, and the like.

At the same time, the image capturing restriction signal receiving unit 103 receives restriction information transmitted by the communication terminal 200 of the subject G001 and subject information, that is, positional information of the subject (step S002).

Next, the image capturing restriction unit 103 compares the image capturing area obtained as described in the above with the positional information of the subject received by the image capturing restriction signal receiving unit 103, and judges whether or not there is the subject generating an image capturing restriction signal in the image capturing area (step S003). Here, in the case where there is no such subject (No at step S003), the image capturing restriction unit 103 does not restrict an image capturing so that the image capturing unit 101 continues capturing an image and a capturing prospective picture is captured (step S004).

Figure 5:
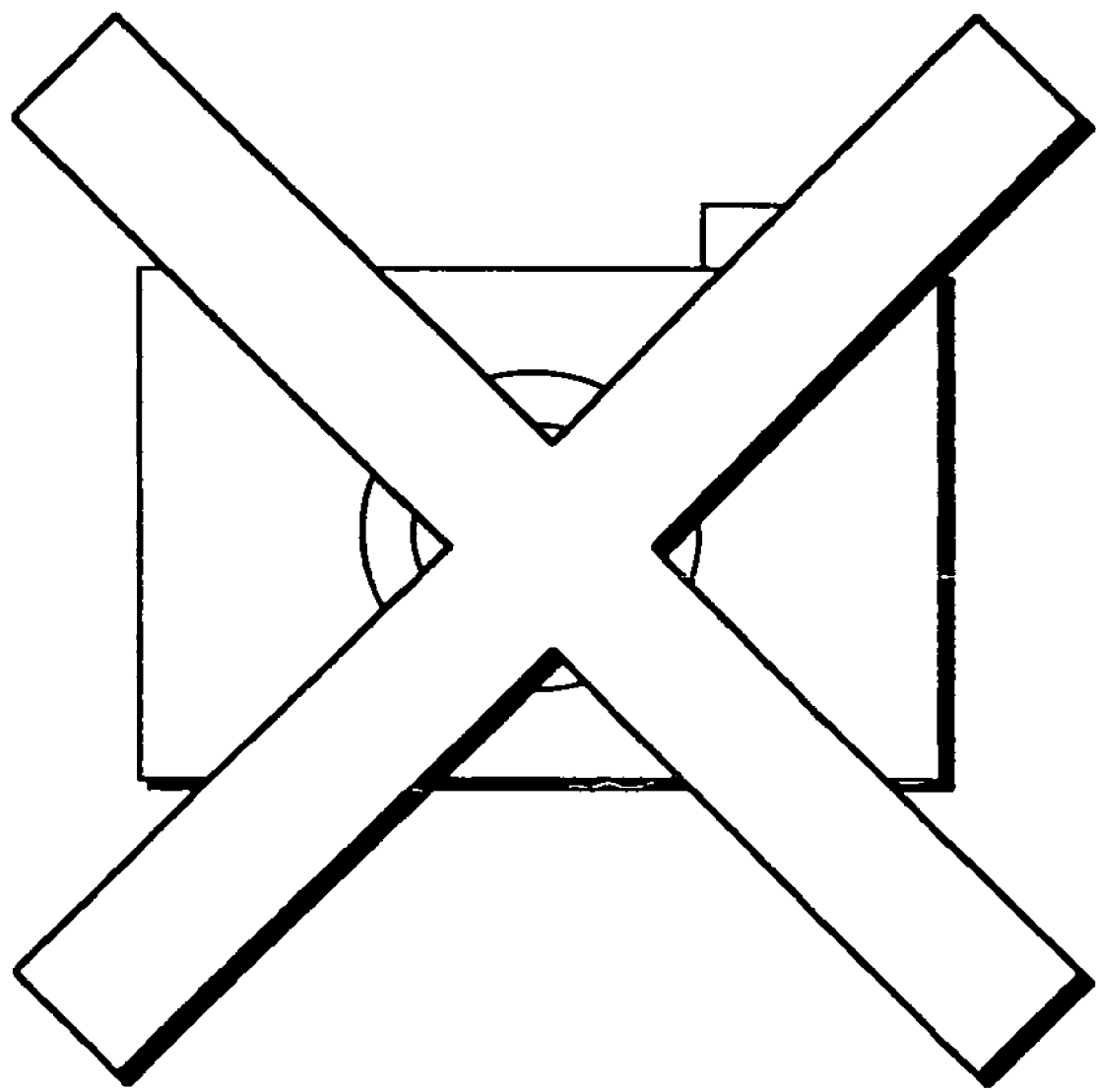
FIG. 5 is a schematic diagram showing an example of a picture for presenting an image capturing prohibition state in the present invention to an image taker.

On the other hand, in the case where there is the subject generating the image capturing restriction signal in the image capturing area (Yes at step S003), the image capturing restriction unit 103 performs processing on the capturing prospective picture in accordance with the request of the image capturing restriction signal (step S005). Herein, in the case where the restriction information of the image capturing restriction signal received by the image capturing restriction signal receiving unit 103 indicates "photographing is prohibited", the image capturing restriction unit 103 may stop the image capturing performed by the image capturing unit 101, and notify the image taker, for example, that "photographing is not allowed in here" in voice. Also, as shown in FIG. 5, it may present a picture indicating that photographing is not allowed to a finder, a display and the like of the image capturing apparatus 100. Herein, the image capturing unit 101 does not store the capturing prospective picture into a memory.

Also, in the case where the restriction information of the image capturing restriction signal indicates that "this subject only is prohibited for photographing", the image capturing restriction unit 103 processes the region where the subject is found so as not to allow photographing the region as an capturing-prohibited region, and performs capturing of the processed image. As a processing in the capturing-prohibited region, only the capturing-prohibited region may be processed in mosaic, or the image in the region may be replaced to another image.

Figure 6A:
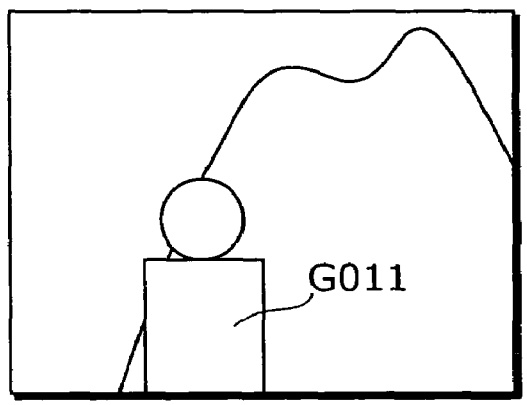
FIG. 6 is a schematic diagram for explaining a mosaic processing on a captured picture in the present invention.
Figure 6B:
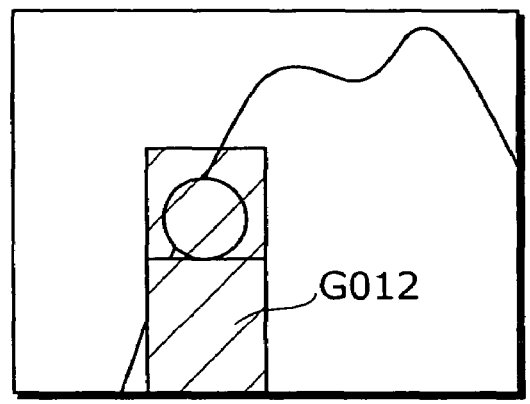
Figure 6C:
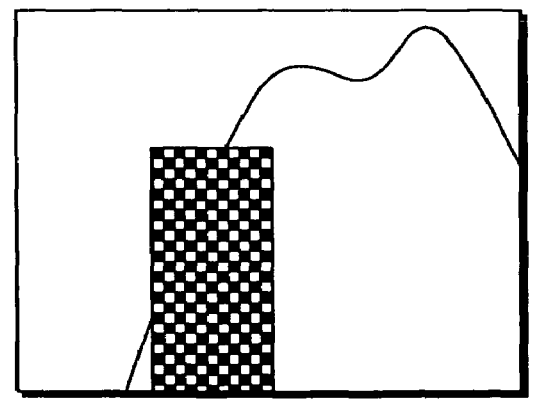

FIGS. 6A-6C are schematic diagrams for explaining a mosaic processing on a captured picture. FIG. 6A shows a capturing prospective picture which is expected to be captured by the image capturing unit 101 in the case where there is no subject generating the image capturing restriction signal, that is, where the image capturing restriction unit 103 does not perform any processes. FIG. 6B shows a capturing-prohibited region G012 that is a position of the subject obtained by the image capturing restriction unit 103. FIG. 6C shows a mosaic-processed picture that is actually captured and obtained in the capturing-prohibited region G012.

Here, it is assumed that the subject G011 shown in FIG. 6A is a subject transmitting restriction information indicating that "this subject only is prohibited for photographing ". In this case, the image capturing restriction unit 103 first calculates at which position in the capturing prospective picture, the subject is captured, using the positional information of the subject and the image capturing information by the image capturing unit 101. This can be realized by using a perspective projection conversion. The image capturing restriction unit 103 designates the calculated position where the subject is captured as the capturing-prohibited region G012 as shown in FIG. 6B. The image capturing restriction unit 103 then performs, for example, mosaic processing on the capturing-prohibited region G012 as shown in FIG. 6C and obtains a captured picture. Note that, such processing is not only limited to the mosaic processing but, for example, a processing of painting in one color, of complementing with a color in a pixel close to the capturing-prohibited region, and the like may be performed. Also, it may be a processing of simply deleting the capturing-prohibited region G012.

Figure 7A:
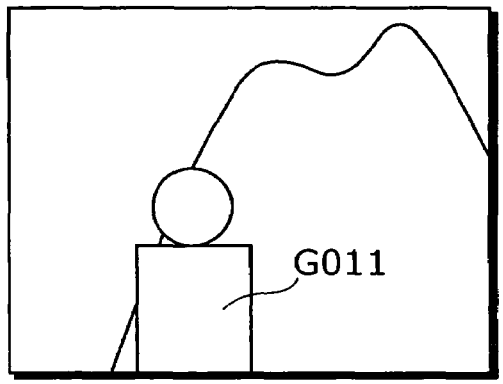
FIG. 7 is a schematic diagram for explaining a replacement processing performed on the captured picture in the present invention.
Figure 7B:
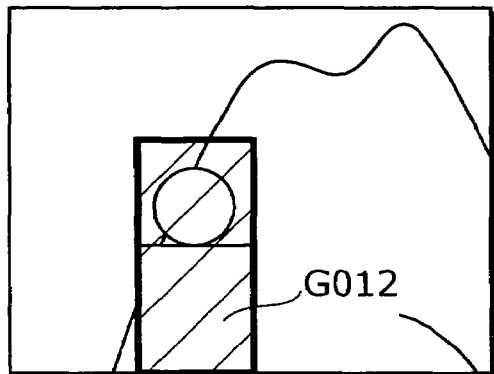
Figure 7C:
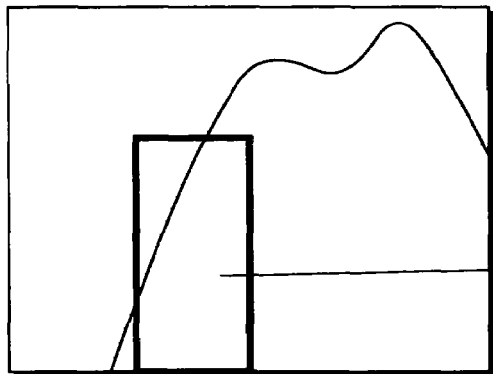
Figure 7D:
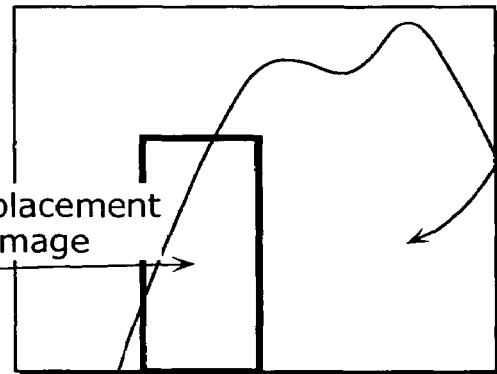

FIGS. 7A-7D are schematic diagrams for explaining a replacement processing of a captured picture. FIG. 7A shows a capturing prospective picture same as in FIG. 6A. FIG. 7B shows a capturing-prohibited region G012 same as in FIG. 6B. FIG. 7C shows a background picture stored in a server and the like. FIG. 7D shows a picture in which the capturing-prohibited region G012 is replaced, that is actually captured and obtained.

Here, as similar to the explanation of the mosaic processing, the subject G011 shown in FIG. 7A is a subject transmitting restriction information indicating that "this subject only is prohibited for photographing". Herein, as similar in the case of the mosaic processing, the image capturing restriction unit 103 first obtains the capturing-prohibited region G012 as shown in FIG. 7B. The image capturing restriction unit 103 then obtains the background image excluding the subject as shown in FIG. 7C in an environment to be captured. Next, the image capturing restriction unit 103, as shown in FIG. 7D, replaces the capturing-prohibited region G012 to an image in a region with the same obtained background image, and obtains a captured picture.

Here, such background picture is stored in a server prepared for each region and may be transmitted using a communication unit such as, for example, Dedicated Short Range Communication (DSRC). In this case, the background image, in general, changes depending on a position where the image capturing apparatus 100 is located and on which direction an image is captured. Therefore, there is a necessity of storing a vast number of background images. Here, this problem is solved by generating an arbitrary viewed picture obtained from several background images. As a method of generating an arbitrary viewed picture, for example, there is a method disclosed in "T. Takahashi, H. Kawasaki, K. Ikeuchi, and M. Sakauchi: "Arbitrary View Position and Direction Rendering for Large-Scale Scenes", Proc. IEEE Conf. on Computer Vision and Pattern Recognition, Vol. 2, pp. 296-303, 2000." This is a method of generating an arbitrary viewed picture from a plurality of panoramic images whose image capturing position and direction are known.

Such background picture may be retrieved from pictures stored in the Internet and the like. Also, the vast number of images is previously stored, and an appropriate image may be selected from among the stored images to be used as a background picture.

Further, as only a face region of a subject is processed in mosaic by the image capturing apparatus 100 or is replaced to an another image, a request indicating that "face region of this subject only is prohibited for photographing" can be sent as the restriction information of the image capturing restriction signal.

Furthermore, a request indicating that "only this subject can be photographed" can be sent as the restriction information of the image capturing restriction signal. This is effective, for example, for the subject who does not want to be known where he/she was at certain time. In this case, similar to the case where the restriction information indicates that "this subject only is prohibited for photographing", methods such as a method of replacing the background part to another image and of processing in mosaic can be used. Further, the subject region only may be cut out so as not to include the background in the captured picture.

SECOND EXAMPLE

In the second example, an image feature is attached as the subject information. The image feature is information necessary for specifying a subject from the captured picture. For example, in the case where the subject wishes that an image of his/her face not be captured, face features such as line, shape information and color information of eyes, nose, mouth, ears and the like are attached. Also, in the case where the subject wishes that an image of his/her whole body not be captured, colors and patterns of clothe which he/she wears therein, further, height, body shape, hair style and the like may be used as the image features.

Figure 8A:
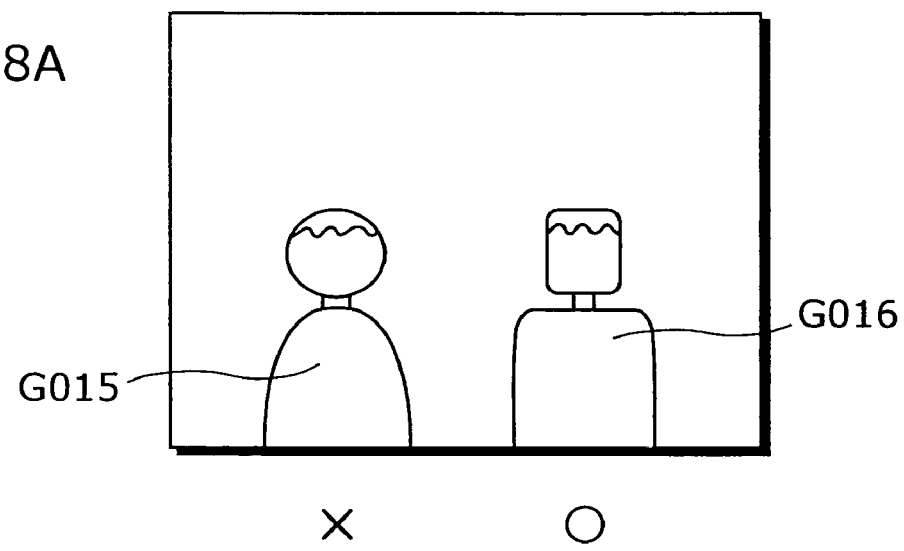
FIG. 8 is a schematic diagram for explaining a processing performed on a captured picture in the present invention.
Figure 8B:
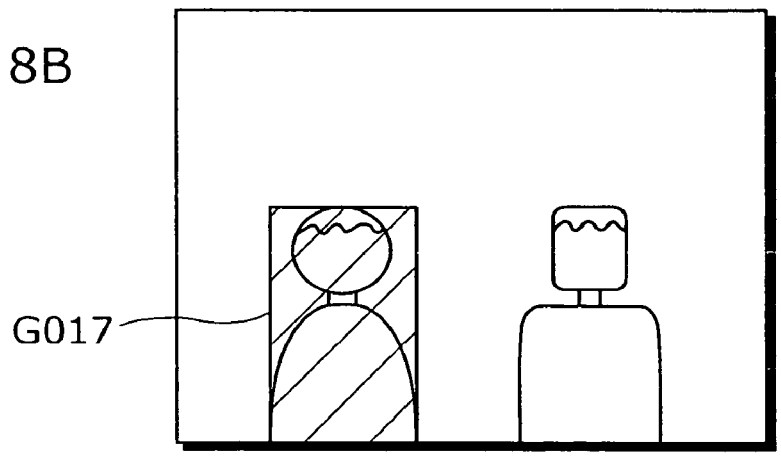
Figure 8C:
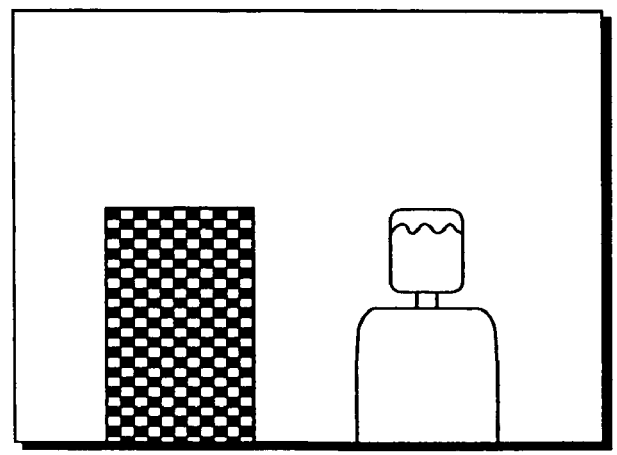
Figure 9:
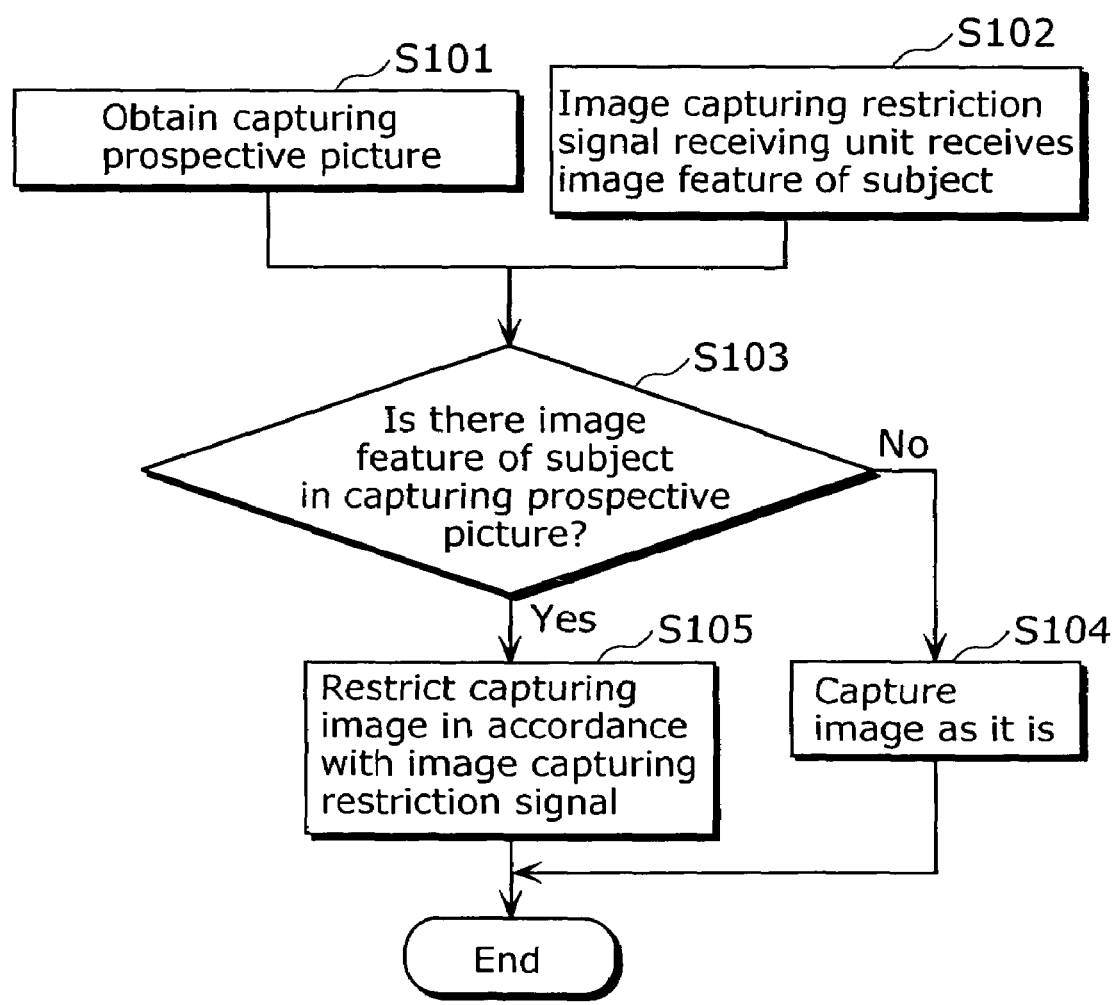
FIG. 9 is a flowchart showing a flow of operations in an image capturing apparatus in a second example of the first embodiment.

FIG. 9 is a flowchart showing a flow of operations by the image capturing apparatus 100 in the second example. FIGS. 8A-8C are schematic diagrams for explaining a processing on a captured picture in the second example. FIG. 8A shows a capturing prospective picture which expected to be captured by the image capturing unit 101 when there is no subject generating the image capturing restriction signal. FIG. 8B shows a capturing-prohibited region G017 that is a position of the subject obtained by the image capturing restriction unit 103. FIG. 8C shows a mosaic processed picture that is actually obtained by image capturing in the capturing-prohibited region G017.

The image capturing unit 101 first obtains a capturing-prospective picture which is to be captured (step S101). At the same time, the image capturing restriction signal receiving unit 103 receives an image capturing restriction signal to be transmitted from the communication terminal 200 and, the subject information, that is, an image feature of the subject (step S102).

The image capturing restriction unit 103 then judges whether or not the image feature of the subject received by the image capturing restriction signal receiving unit 103 is found in the capturing prospective picture obtained as described in the above (step S103). Note that, as a method of detecting a person from a picture using a feature, following methods can be used: a method of using a template matching, or a method of identifying a face picture as described, for example, in the webpage on the Internet <http://www.identix.com/products/pro_facial_faceit.html> and the webpage on the Internet <http://www.society.omron.co.jp/faceid/5/f5.html>, and the like.

As the result of the judgment, in the case where there is no image feature of the subject in the capturing prospective picture (No at step S103), the image capturing restriction unit 103 does not restrict the image capturing; the image capturing unit 101 captures an image as it is; and the capturing prospective picture is captured (step S104). On the other hand, in the case where there is an image feature of the subject in the capturing prospective picture (Yes at step S103), it is assumed that there is a subject generating the image capturing restriction signal in the region. Therefore, assuming the region as a capturing-prohibited region, the image capturing restriction unit 103 performs similar processing as in the first example according to a request of the image capturing restriction signal (step S105).

For example, in the case where the image feature of the subject transmitted from the communication terminal 200 matches a subject G015 in the capturing prospective picture as shown in FIG. 8A and the restriction information of the image capturing restriction signal indicates that "this subject only is prohibited for photographing", the image capturing restriction unit 103 defines a region where the image feature matches as a capturing-prohibited region G017 as shown in FIG. 8B. The image capturing restriction unit 103 then, for example, performs mosaic processing on the capturing-prohibited region G017 as shown in FIG. 8C, and obtains a captured picture.

Here, when the image capturing restriction unit 103 judges whether or not there is an image feature of the subject in the capturing prospective picture, it may judge that there is no image feature of the subject in the capturing prospective picture, for example, in the case where the image feature of the subject is too small to be recognized after the comparison with the capturing prospective picture, even if there is the image feature of the subject. Also, in the case where, even if there is the image feature of the subject, there are too many people in the capturing prospective picture so that there is a possibility that the subject cannot be identified, and the like, the image capturing restriction unit 103 may judge that there is no image feature of the subject in the capturing prospective picture.

THIRD EXAMPLE

In the third example, a judgment about whether or not there is a subject in the image capturing area is realized by estimating a position of a generation source of the image capturing restriction signal. Therefore, subject information for judging whether or not there is a subject in the image capturing area is unnecessary.

As a method of estimating the generation source of the signal, there are methods of using more than one receiving antenna, and of using a technology of array signal processing (e.g. Kikuma, Nobuyoshi, "Adaptable Signal Processing by Array Antenna", Kagaku-Gijutsu Publications). In the present embodiment, it is necessary to three-dimensionally obtain a position where the image capturing restriction signal is generated. Therefore, it is necessary to place the receiving antennas on a two dimensional plane, for example, in a circle or in a grid. Here, in the present embodiment, a position of the communication terminal 200 is estimated, using a circular array in which the antennas are placed in a circle, and by using a MUSIC method that is an incoming direction estimation method using an eigen value and an eigen vector of a correlation matrix.

Here, the method of estimating a position of the communication terminal 200 is not only limited to the MUSIC method. For example, it may be an ESPRIT method using an ESPRIT algorithm. Also, a single antenna with directivity may be used instead of the array antenna. Herein, it is desired that the image capturing area of the image capturing unit 101 is identical to the directivity of the antenna. In addition, the image capturing restriction signal in the image capturing area only may be received using the array signal processing.

As described in the above, according to the present embodiment, when the image capturing apparatus 100 performs an image capturing, it verifies whether or not the communication terminal 200 of a subject side has allowed the image capturing and restricts the captured picture in accordance with the result so that privacy of the subject is protected and the unauthorized image capturing can be prevented. Therefore, the subject who wishes to restrict the image capturing only needs to carry the communication terminal 200 all the time. In addition, the image capturing apparatus 100 can capture an image without generating sound or light so that it does not bother neighbors when the image capturing is authorized.

Note that, as described in the above, the image capturing restriction signal is transmitted between the image capturing apparatus 100 and the communication terminal 200. However, it may be information concerning privacy of the subject such as image feature of the subject so that a cryptographic communication is desired.

Also, in the present embodiment, data is communicated directly between the image capturing apparatus 100 and the communication terminal 200. However, it may be communicated via a server. This is, for example, realized as follows. First, the communication terminal 200 of the subject which does not allow the image capturing registers positional information and restriction information of the communication terminal 200 to a previously set server. As described in the above, the positional information is obtained by combining, for example, a detecting function of a base station of a GPS and a cellular phone with further an RF tag, a gyro sensor and a height sensor. When the communication terminal 200 moves, it communicates with the server and registers new positional information again so as to update the positional information. Here, it may update the position while communicating with the server all the time. The server then transmits communication terminal registration information indicating in which communication terminal requesting to prohibit image capturing positions. The image capturing apparatus 100 receives the communication terminal registration information being transmitted by the server when image capturing is performed, and verifies whether or not there is a communication terminal 200 which does not allow capturing an image in the image capturing region. Note that, the image capturing apparatus 100 communicates with the server when an image capturing is performed, transmits the image capturing area, and may retrieves whether or not there is the communication terminal 200 which does not allow capturing the image in the image capturing area. Here, in the case where there is no communication terminal 200 which requests to prohibit the image capturing, the image capturing is accordingly performed. On the other hand, in the case where there is the communication terminal 200 which requests to prohibit the image capturing, the image capturing restriction unit 103 receives the restriction information of image capturing restriction signal which the communication terminal 200 has registered, and restricts the capturing prospective picture in accordance with the request.

A DSRC may be used as such a server. In this case, the communication terminal 200 and the image capturing apparatus 100 communicate with a server located in a neighboring area. The server holds information of the communication terminal in a predetermined region. The server may be on the Internet. Also, in the case where the image capturing apparatus 100 and the communication terminal 200 are equipped to a cellular phone terminal, the server may be set as the base station of the cellular phone. In this case, for example, only in the case of transmitting a picture captured by the camera-equipped cellular phone that is the image capturing apparatus 100, the server may control the communication and perform the aforementioned processing. The image definitely passes through the base station when it is transmitted so that the processing can be performed thereat.

Further, in the explanation, it is assumed that the subject is a person. However, the subject is, of course, not limited to a person. For example, in a museum, it is more likely that image capturing is prohibited for a copyright and a maintenance and management of a work of art. In such case, a communication terminal 200 which transmits an image capturing restriction signal using infrared radiation is installed at an environment of an exhibition in the museum and in an exhibit venue so that it allows to prohibit capturing an image of the work of art or at anywhere in the museum.

Thus, an unauthorized image capturing can be prevented by setting the communication terminal 200 at a building itself. For example, it is assumed as the unauthorized image capturing when an image is captured toward a direction other than the window in a train and the like. Therefore, the communication terminal 200 is installed in a train so that in the case where the image is captured, the sound of "it is an unauthorized image capturing" may be generated or the unauthorized image capturing may be directly reported to a conductor, a station staff or a police. Herein, it is judged whether the image capturing is authorized or not. The direction of the image capturing is obtained from the optical axis of the camera, a position of the image capturing apparatus 100, and further from a position of the train.

In addition, there is a case where flashing is prohibited for not to excite animals in a zoo and the like. Therefore, the communication terminal 200 is set to the animals or installed close to the animals, and may generate the image capturing restriction signal which prohibits only the photographing such as flashing from the position near the animals.

Also, in the case where the subject is a famous person or where an image is captured at a tourist spot, it is possible to allow an image capturing by setting a billing system. It is realized, for example, by generating an image capturing restriction signal which allows image capturing under a condition of an automatic money depositing to an account of the subject, and allowing the image capturing when the actual deposit of the money is verified.

Figure 10:
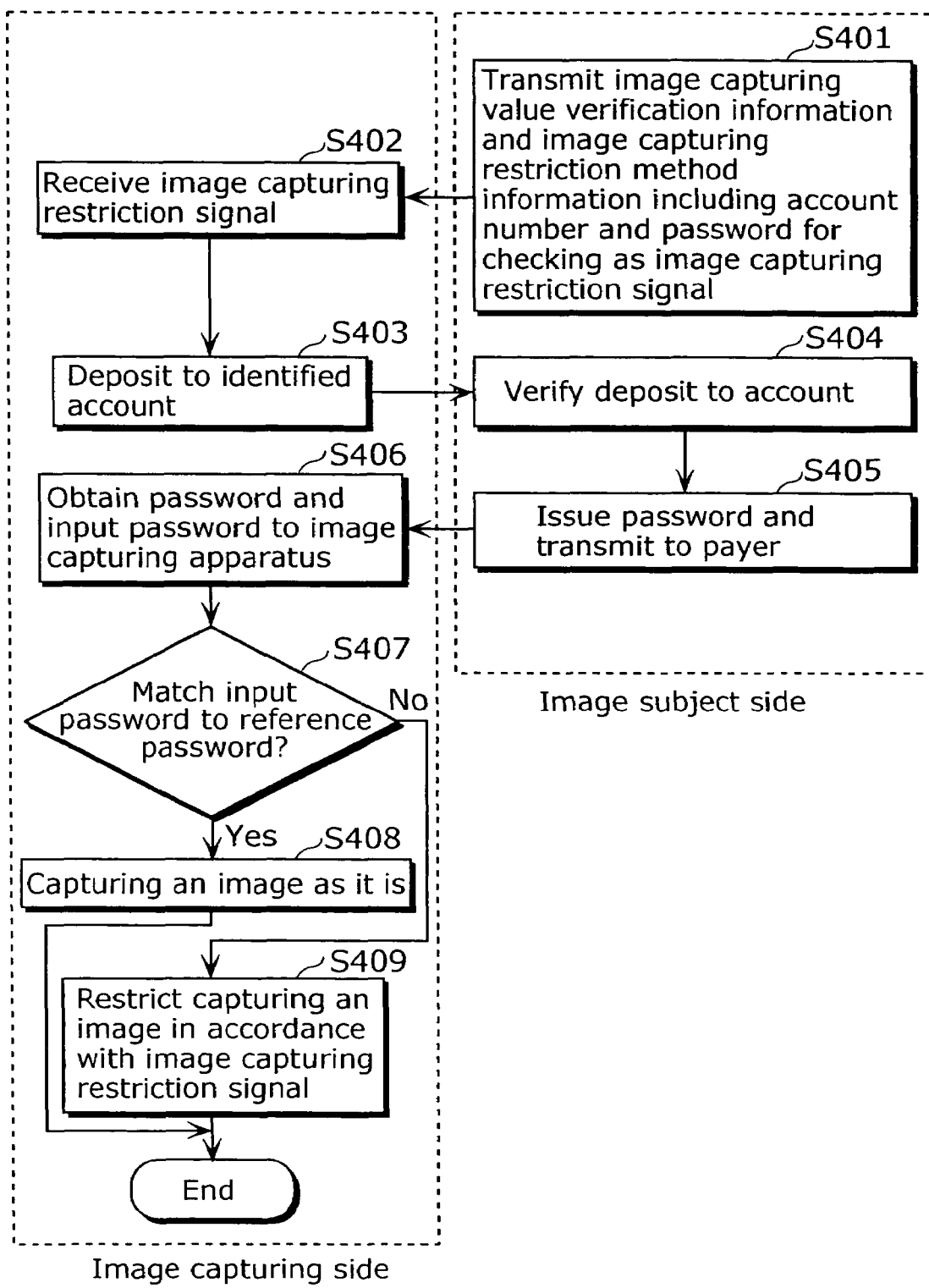
FIG. 10 is a flowchart showing a flow of operations in an image capturing system in the case where billing processing is performed in the first embodiment.

The operation of this case is described with references to drawings. FIG. 10 is a flowchart showing the flow of the operations therein.

The image capturing restriction signal generation unit 201 of the communication terminal 200 transmits, as the image capturing restriction signal, image capturing value verification information including an account number for deposit and a reference image capturing permission password for allowing the image capturing and further the image capturing restriction method information which describes how to restrict the image capturing by the deposit status and the amount of deposit (step S401). This image capturing restriction method information only needs to allow an image capturing, for example, when certain amount of money is deposited, while restricting an image capturing when the money is not deposited. Here, for convenience, the following explanation deals with such image capturing restriction method information.

The image capturing restriction signal receiving unit 102 of the image capturing apparatus 100 receives the image capturing restriction signal (step S402). Herein, the image capturing apparatus 100 cannot verify the reference image capturing permission password. Such processing may use, for example, a cryptographic processing. Here, if the image taker wishes to perform an image capturing even with the payment of the value, he/she deposits money into the account for deposit using an Internet banking and the like (step S403). When the deposit of money is verified (step S404), the communication terminal 200 of the subject side issues and transmits an image capturing permission password for allowing the image capturing (step S405).

The image taker inputs the image capturing permission password obtained by depositing the money to the image capturing apparatus 100 (step S406). The image capturing restriction unit 103 refers whether or not the image capturing permission password inputted by the image taker matches the reference image capturing permission password transmitted as the image capturing value verification information (step S407). As the result of the matching, in the case where the image capturing permission password matches the reference image capturing permission password, that is to say, in the case where the image capturing permission password inputted by the image taker is correct (Yes at step S407), the image capturing restriction unit 103 captures an image as it is in accordance with the image capturing restriction method information (step S408). On the other hand, as the result of the matching, in the case where the image capturing permission password does not match the reference image capturing permission password, that is, in the case where the image capturing permission password inputted by the image taker is incorrect (No at step S407), the image capturing restriction unit 103 judges that the image taker has not paid the deposit, in accordance with the image capturing restriction method information, it restricts the image capturing by the method described in the above, and obtains the captured picture (step S409).

Such billing processing can be performed not just the time of capturing an image, but before capturing the image. This can be embodied by notifying, for example, an account number for capturing a person or a tourist spot through a homepage and an electronic mail, or by using various commercial means.

Also, the value in the processing is not limited to money but it can be, for example, being a member of viewing a commercial, answering a questionnaire, participating in a volunteer activity, subscribing a mailing magazine, and the like.

Further, it is more likely to happen that a group photo is taken at a tourist spot. Herein, if even one of the subjects generates a request of "photographing prohibition" as the restriction information of the image capturing restriction signal, the group photo cannot be taken. Also, only limited to such occasion, a large amount of energy is required to temporarily switch the image capturing restriction signal for all of the subjects to be taken in the group photo. Therefore, at such group photo spot, the photographing prohibition request may be forcibly cancelled. Of course, in such a case, it is desired to notify the subjects that "photographing prohibition" request cannot be made.

Furthermore, in the case where photographing is allowed only for an individual use, the photographing may be allowed under a condition of embedding a limit of the number of picture duplication times into a picture. The limitation of the number of picture duplication times can be realized using an electronic watermarking technology.

Also in the present embodiment, it is explained that the processing is performed when the image capturing apparatus 100 performs an image capturing. However, for example, it can be understood by the image taker about whether or not the image capturing can be performed in this environment before the image capturing is performed. This can be embodied by capturing a picture when a shutter is pressed; storing the picture processed by the image capturing restriction unit 103 temporarily in a memory; and presenting it on a display and the like to the image taker. If the image taker likes the picture, the picture is actually stored. If the image taker does not like the picture, it just needs to be deleted.

Figure 11:
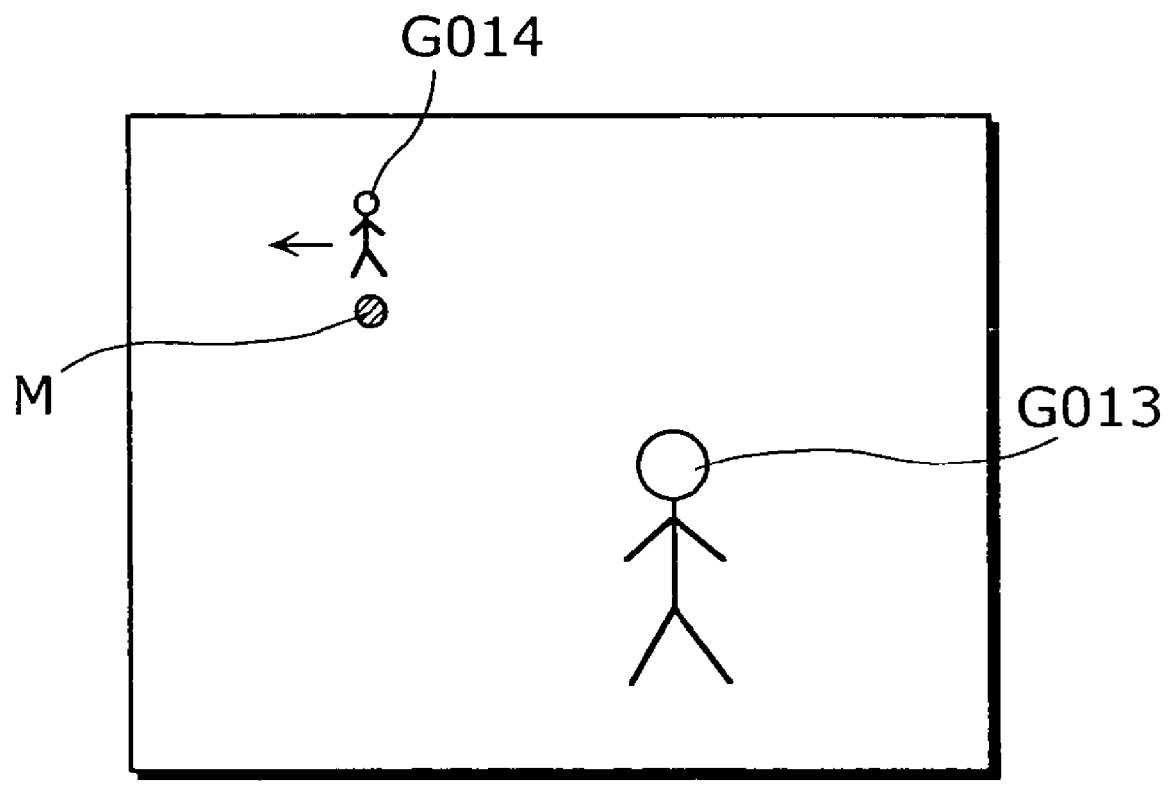
FIG. 11 is a schematic diagram showing an example of displaying to a display, a finder and the like of the image capturing apparatus according to the present invention.

Furthermore, on a display or a finder of the image capturing apparatus 100, it can be displayed all the time to the image taker about whether or not the subject is prohibited for an image capturing or about what kinds of image capturing restrictions are given. FIG. 11 is a schematic diagram showing an example of a presentation on a display, a finder and the like of the image capturing apparatus 100. Here indicates a case where the subject G013 does not have an image capturing restriction but the subject G014 is prohibited for an image capturing. In the case where the image capturing restriction is given to the subject, it can be presented to the image taker that the subject is restricted for an image capturing by presenting, for example, a mark M as shown in FIG. 11 on a display, finder and the like of the image capturing apparatus 100. For example, as shown in FIG. 11, in the case where an image capturing restriction is given only to the subject G014 who walks behind the subject G013 whose image is to be captured, it can be verified that the image is allowed for capturing soon after the subject G014 with image capturing restriction has passed. Also, variations of the image capturing restrictions can be indicated, for example, by changing a color of the mark M.

Second Embodiment

Figure 12:
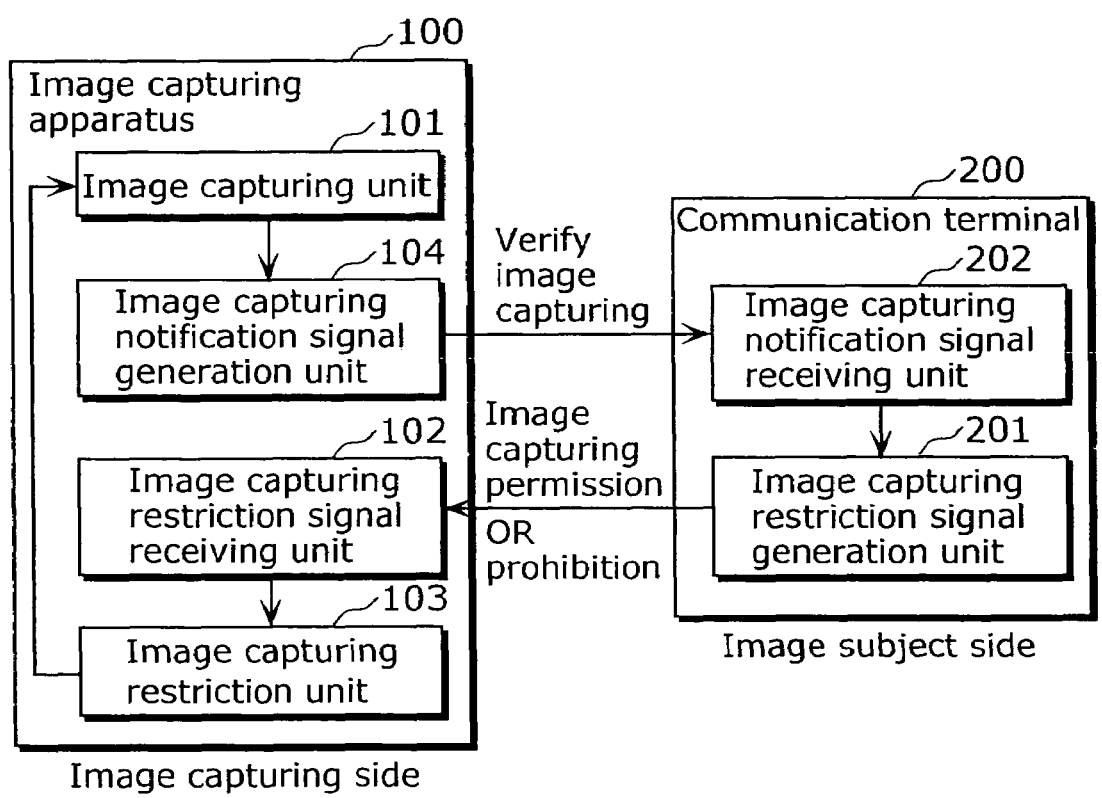
FIG. 12 is a block diagram showing a structure of an image capturing system according to a second embodiment of the present invention.

FIG. 12 is a block diagram showing a structure of an image capturing system according to a second embodiment of the present invention.

The image capturing system has, in addition to the constituents explained in the first embodiment, an image capturing notification signal generation unit 104 in the image capturing apparatus 100 and an image capturing notification signal receiving unit 202 in the communication terminal 200. Other constituents are same as in the first embodiment. Note that, same reference numbers are assigned to same constituents as in the first embodiment and the detailed explanations about the same constituents are not repeated here.

In the first embodiment, it is explained about an example which the communication terminal 200 transmits the image capturing restriction signal all the time to judge whether or not there is a subject in an image capturing area. However, in the present embodiment, an image capturing notification signal is transmitted in the image capturing area and only the communication terminal 200 of the subject which has received the image capturing notification signal replies to the image capturing restriction signal. Therefore, the image capturing restriction signal generation unit 201 does not need to generate the signal all the time as well as attaching the subject information.

The image capturing notification signal generation unit 104 transmits, to the communication terminal 200, an image capturing notification signal which notifies the subject that the image capturing apparatus 100 is about to capture an image of the subject. The image capturing notification signal includes image taker information which is explained later.

Herein, by setting a signal transmission area of the image capturing notification signal generation unit 104 to be as identical to the image capturing area, the image capturing notification signal can be transmitted only to the subject found in the image capturing area. Thus, in order to transmit the image capturing notification signal in the image capturing area, a radio wave with directivity such as infrared radiation may be transmitted to the same direction as an optical axis of the image capturing unit 101 and to an area as wide as an angle of visibility of the image capturing unit 101. Further, by controlling power of the radio wave according to a zoom, the image capturing notification signal can be transmitted to the subject in a far distance when an image is captured with a zoom-out. Also, it can be transmitted only to a close subject when an image is closely captured.

Accordingly, the array signal processing is used for transmitting the image capturing notification signal only to the image capturing area by a radio wave. In the array signal processing, it is possible to restrict an area in which the signal is transmitted by controlling phases and power of the plurality of transmission antennas. Therefore, by using the plurality of transmission antennas, the transmission angle can be controlled. Also, as described in the above, by controlling power of the radio wave according to a zoom, the image capturing notification signal can be transmitted to the subject in a far distance when an image is captured with a zoom-out. Further, it can be transmitted only to a close subject when an image is closely captured. Thus, using the radio wave for example, even in the case where the communication terminal 200 is left in a physically shielded place such as in a bag, the image capturing notification signal can be precisely transmitted. Note that, a signal-transmission antenna with directivity can be used.

The image taker information is ID information for specifying an image taker. For example, it is one or more of a telephone number, ID number, e-mail address, name, age, sex, a face picture of the image taker and the like. Thus, the image taker information is the ID information of the image taker, concerning privacy of the image taker. Therefore, it is desired to perform cryptographic communication for the image capturing notification signal.

Also, the image taker information may be a position and direction information of the image capturing apparatus 100, such as from where and in which direction the image taker is capturing an image. As described in the above, such information is obtained by combining, for example, a detection function of a base station of a GPS and a cellular phone, further an RF tag, a gyro sensor and a height sensor.

On the other hand, the image capturing notification signal receiving unit 202 of the communication terminal 200 receives an image capturing notification signal transmitted by the image capturing apparatus 100. The image capturing restriction signal generation unit 201 then checks the image taker information included in the image capturing notification signal, and judges whether it allows the person to perform an image capturing or allows under an image capturing condition. Based on the judgment result, the image capturing restriction signal generation unit 201 transmits the image capturing restriction signal to the image capturing apparatus 100 as in the first embodiment.

As a method of giving permission for an image capturing, for example, it may be a method of giving permission only to the image taker to whom the subject has registered, or a method of judging based on sex and age of the image taker. It is, for example, can be set to allow only females to perform an image capturing, or to allow only those who are under 30 to perform the image capturing. Note that, the subject may directly check the image taker information and judge whether or not to give permission to the image taker.

Also, in the case where the subject is a well-known person or where the subject takes a picture at a tourist spot, it is possible to allow an image capturing by setting a billing system. In this case, for example, only the image taker who has paid the value may be allowed to perform an image capturing, by verifying whether the money has been deposited to an account of the subject.

Figure 13:
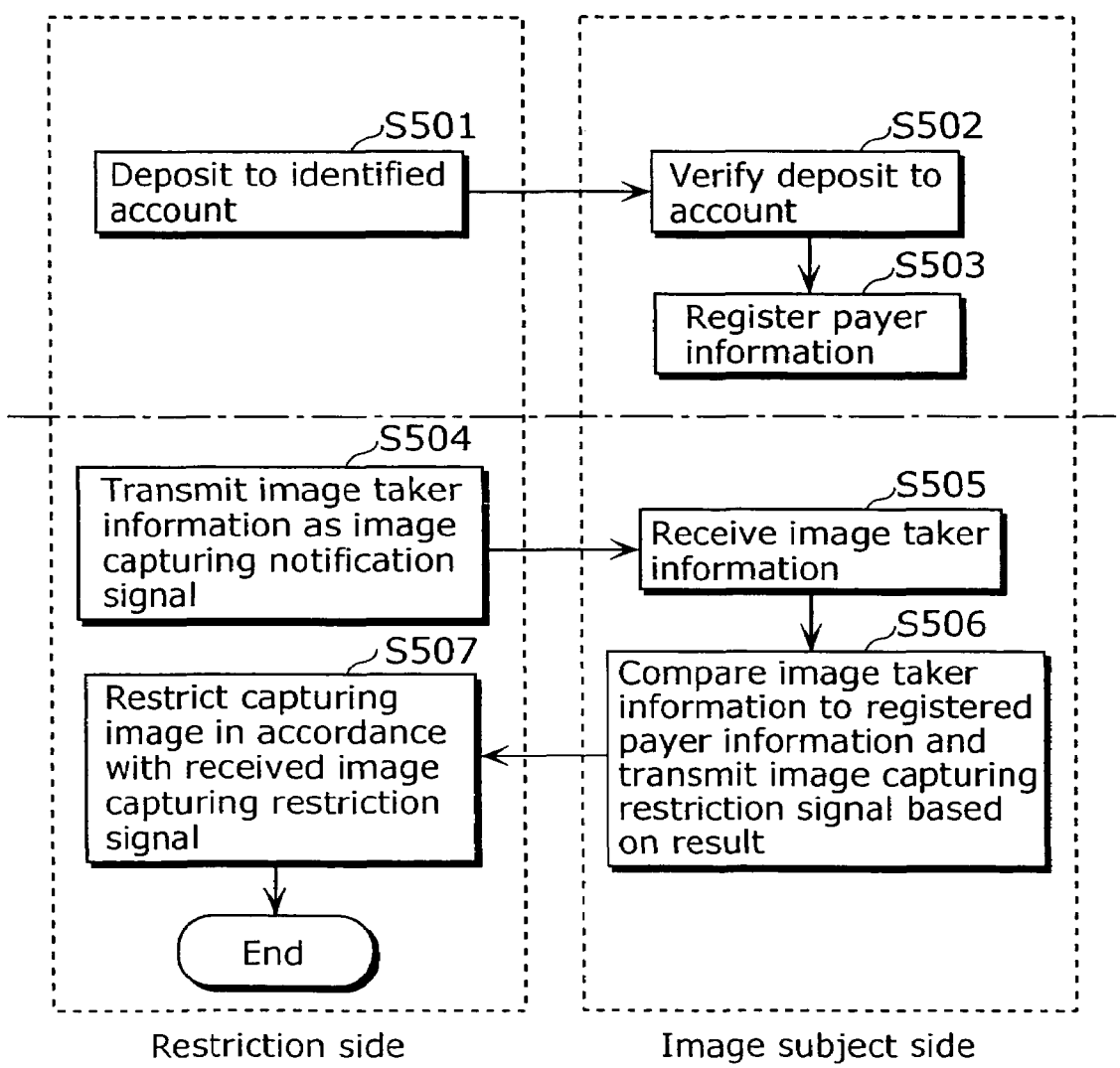
FIG. 13 is a flowchart showing a flow of operations in the image capturing system in the case where the billing processing is performed in the second embodiment.

Here, operations in this case are explained with references to a diagram. FIG. 13 is a flowchart showing a flow of operations therein.

First, an account number used for capturing an image of a person and a tourist spot is previously notified using a homepage, an electronic mail, or various commercial means. When an image taker wishes to perform an image capturing even paying the value, the image taker deposits the money into the account using an account transfer, the Internet banking and the like (step S501). Once the deposit is verified (step S502), the communication terminal 200 at the subject side registers the payer information at the server (step S503).

When the image capturing is performed, the image capturing notification signal generation unit 104 of the image capturing apparatus 100 transmits, to the communication terminal 200, the image capturing notification signal including the ID information of the image taker as the image taker information (step S504). The image capturing notification signal receiving unit 202 of the communication terminal 200 receives the image capturing notification signal (step S505). The image capturing restriction signal generation unit 201 compares the ID information of the image taker included in the image capturing notification signal with account payer information registered at the server so as to verify whether or not the image taker has paid the value. Here, in the case where the ID information of the image taker has been registered as a payer, the image capturing restriction signal generation unit 201 transmits an image capturing restriction signal which allows or restricts an image capturing. On the other hand, in the case where the ID information of the image taker has not been registered as a payer, the image capturing restriction signal generation unit 201 transmits the image capturing restriction signal which restricts or prohibits an image capturing as described in the above (step S506). The image capturing restriction signal receiving unit 102 of the image capturing apparatus 100 receives the image capturing restriction signal, and the image capturing restriction unit 103 performs an image capturing in accordance with a request of the image capturing restriction signal (step S507).

Also, the value in the processing is not limited to money. For example, it can be viewing a commercial, answering a questionnaire, participating in a volunteer activity, registering as a member, and the like.

Further, the RF tag, for example, can be used for communicating data between the image capturing apparatus 100 and the communication terminal 200. Information indicating to allow an image capturing, to prohibit only an image capturing of the subject, and the like are embedded in the RF tag so that the RF tag can transmit information by switching the pieces of embedded information. The RF tag can usually reply information embedded in the tag, even in a shielded state such as in a bag and the like, when receiving the signal. Therefore, it can precisely transmit and receive the image capturing notification signal and the image capturing restriction signal.

Also, in the present embodiment, the data is communicated directly between the image capturing apparatus 100 and the communication terminal 200. However, the communication may be performed via a server. It is, for example, embodied as follows. First, the communication terminal 200 of the subject who does not allow an image capturing registers, to a pre-set server, positional information and restriction information of the communication terminal 200. The positional information is obtained by combining a GPS, a detecting function of a base station of a cellular phone, further, an RF tag, a gyro sensor, and a height sensor. When the communication terminal 200 is moved, it communicates with a server, and updates new positional information by registering it again. Note that, the position may be updated while continuously communicating with the server. The image capturing apparatus 100 then communicates with the server when it performs an image capturing, transmits the image capturing area, and retrieves whether there is a communication terminal 200 which does not allow to perform an image capturing in the image capturing area. Here, in the case where there is no communication terminal 200 which requests restricting an image capturing in the image capturing area, the image capturing apparatus 100 captures an image as it is. On the other hand, in the case where there is a communication terminal 200 which requests restricting an image capturing in the image capturing area, the image capturing restriction unit 103 receives restriction information of the image capturing restriction signal registered by the communication terminal 200, and gives restriction on the capturing prospective picture according to the request.

Further, the communication terminal 200 can change the image capturing restriction signal for each image capturing apparatus 100. Hereafter, it is explained about a method of switching the image capturing restriction signals using a telephone number of the image capturing apparatus 100 with references to a diagram.

Figure 14:
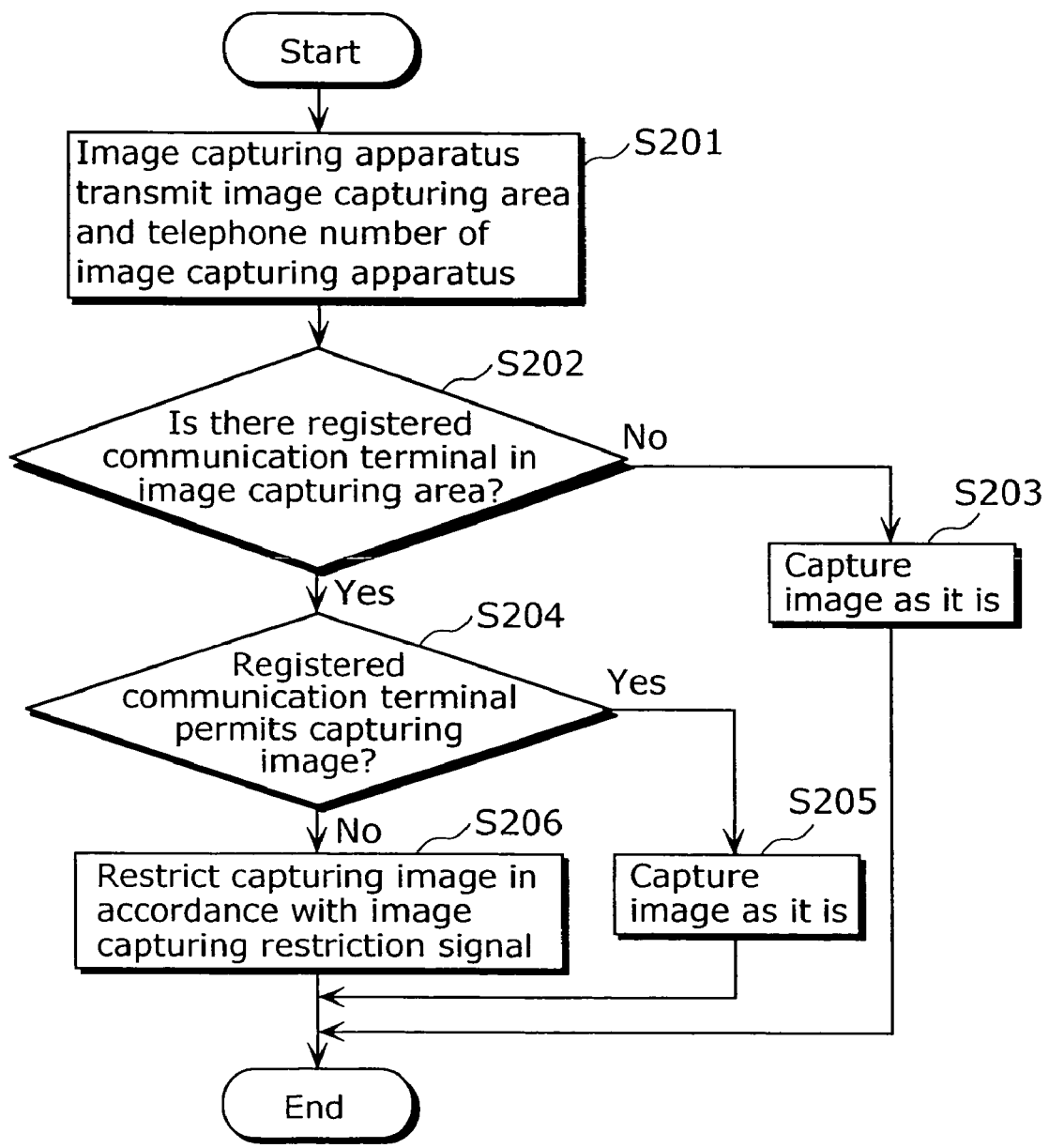
FIG. 14 is a flowchart showing a flow of operations in an image capturing apparatus in a method using a server in the second embodiment.

FIG. 14 is a flowchart showing a flow of operations in the image capturing apparatus 100 therein.

The communication terminal 200 previously registers, at the server, positional information, a telephone number of the image capturing apparatus 100 which allows an image capturing, and restriction information for the case where the image capturing is not allowed. The image capturing apparatus 100 transmits the image capturing area and the telephone number of the image capturing apparatus 100 to the server when an image capturing is performed (step S201). In response to this, the sever verifies whether or not there is a registered communication terminal 200 in the image capturing area transmitted from the image capturing apparatus 100 (step S202). Here, in the case where the communication terminal 200 is not registered in the image capturing area (No at step S202), the server transmits, to the image capturing apparatus 100, the image capturing restriction signal for allowing capturing an image as it is, and the image capturing apparatus 100 captures the image as it is (step S203).

On the other hand, in the case where the communication terminal 200 is registered in the image capturing area (Yes at step S203), the server compares the telephone number of the image capturing apparatus 100 with the telephone number registered by the communication terminal 200, and verifies whether or not the registered communication terminal 200 allows the image capturing apparatus 100 which is about to perform an image capturing to perform an image capturing (step S204). Herein, in the case where the image capturing apparatus 100 is allowed to perform an image capturing (Yes at step S204), the server transmits, to the image capturing apparatus 100, an image capturing restriction signal which allows capturing an image as it is (step S205).

On the other hand, in the case where the image capturing apparatus 100 is not allowed to perform an image capturing by the communication terminal 200 in the image capturing area (No at step S204), the server transmits, to the image capturing apparatus 100, the restriction information registered by the communication terminal 200 which does not allow to perform an image capturing as the image capturing restriction signal, and the image capturing restriction unit 103 of the image capturing apparatus 100 restricts the image capturing in accordance with the request (step S206).

The DSRC may be used as such a server. In this case, the communication terminal 200 and the image capturing apparatus 100 communicate with a nearby server, and the server holds information of the communication terminal in a predetermined region. The server can be located on the Internet. Also, in the case where the image capturing apparatus 100 and the communication terminal 200 are equipped to a cellular phone terminal, the server may be set to the base station of the cellular phone. Herein, for example, only in the case of transmitting a picture taken with a camera-equipped cellular phone that is an image capturing apparatus 100, the server may control and perform the processing described in the above.

Further, information to be registered at the server by the communication terminal 200 is not necessary to be the telephone number of the image capturing apparatus 100. It may be one or more of an ID number that is ID information which can specify a position of the image capturing apparatus 100 and the image taker, an e-mail address, a name, age, sex, a face picture of the image taker, and the like.

As described in the above, in the present embodiment, the image capturing apparatus 100 checks with the communication terminal 200 at the subject side which is expected to be included in a picture to be captured when an image capturing is performed and restricts the picture to be captured according to whether or not the communication terminal 200 at the subject side allows to perform an image capturing. Therefore, privacy of the subject is protected and unauthorized image capturing can be prevented. Also, the image capturing apparatus 100 can perform an image capturing without generating sounds or lights so that it can prevent to bother neighbors when the image capturing is authorized.

Note that, in the case where the communication terminal 200 at the subject side receives the image capturing notification signal transmitted by the image capturing apparatus 100, and transmits, to the image capturing apparatus 100, the image capturing restriction signal indicating that, for example, "this subject only is prohibited for photographing", it may capture, at the subject side, an image that is seen as a back of the subject from the image capturing apparatus 100, and transmits the image together with the image capturing restriction signal to the image capturing apparatus 100. In this case, the image capturing apparatus 100 can create an image applicable to the capturing-prohibited region using the image transmitted from the subject side, and replace to the created image.

Third Embodiment

Figure 15:
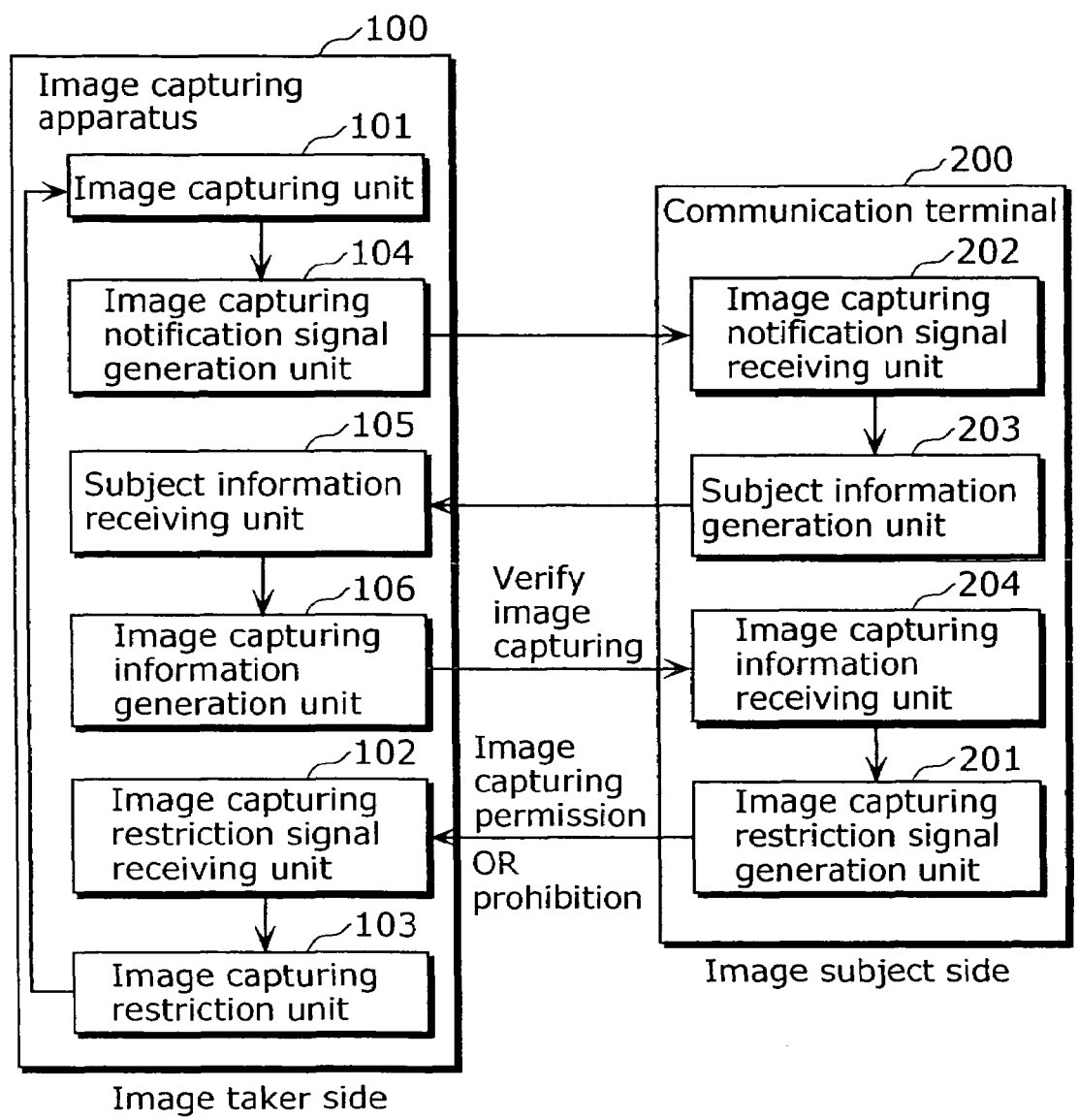
FIG. 15 is a block diagram showing a structure of an image capturing system according to a third embodiment of the present invention.

FIG. 15 is a block diagram showing a structure of an image capturing system according to a third embodiment of the present invention.

The image capturing system has, in addition to the constituents explained in the second embodiment, a subject information receiving unit 105 and an image capturing information generation unit 106 in the image capturing apparatus 100, and a subject information generation unit 203 and an image capturing information receiving unit 204 in the communication terminal 200. Other constituents are same as in the second embodiment. Here, same reference numbers are attached to the constituents that are same as in the second embodiment and the detailed explanations about the same constituents are not repeated.

The difference of processing in the present embodiment with that in the second embodiment is that the image capturing apparatus 100 transmits image capturing information to a subject so that the subject judges whether or not to give a permission or prohibition of an image capturing. The image capturing information transmitted by the image capturing apparatus 100 can be prospective image information which is expected to be captured by the image capturing unit 101. Herein, in the case where a capturing prospective picture which has not been allowed for an image capturing is transmitted in order to obtain permission for an image capturing, there is a possibility that the picture may be eavesdropped by a receiving apparatus held by someone other than the subject. Also, in the case where there is a plurality of subjects, there is a problem on privacy since a picture in which a subject is captured is transmitted to another subject. Accordingly, in the present embodiment, the capturing prospective picture is transmitted and received through cryptography. As the cryptographic method, a public key cryptographic method that is a cryptography using a public key and a private key is used.

This public key cryptographic method is a well-known encryption method. A user of the cryptography has two types of keys called a public key and a private key in order to perform encryption and decryption, and releases only the public key. What is encrypted with a public key can be decrypted only with a paired private key of a same key holder. On the contrary, what is encrypted with the private key can be decrypted only with the paired public key of the same key holder. Therefore, in the case where it is wished to transmit encrypted information to a user A, the information can be encrypted with a public key of A. If the information encrypted with the public key of A is received by a user B who is not the user A, the encrypted information cannot be decrypted since the user B does not have the private key of A. On the other hand, the user A can decrypt the encrypted information with own private key so that it is possible to perform communication without being eavesdropped. Also, in the case where the user A transmits encrypted information to a user C, if the information is encrypted with a private key of A, the user C who has received the encrypted information can decrypt it with a public key of A. Herein, the private key which is owned solely by A only can encrypt the information which can be decrypted by the public key of A so that a fraud of a transmitter can be prevented.

Figure 16:
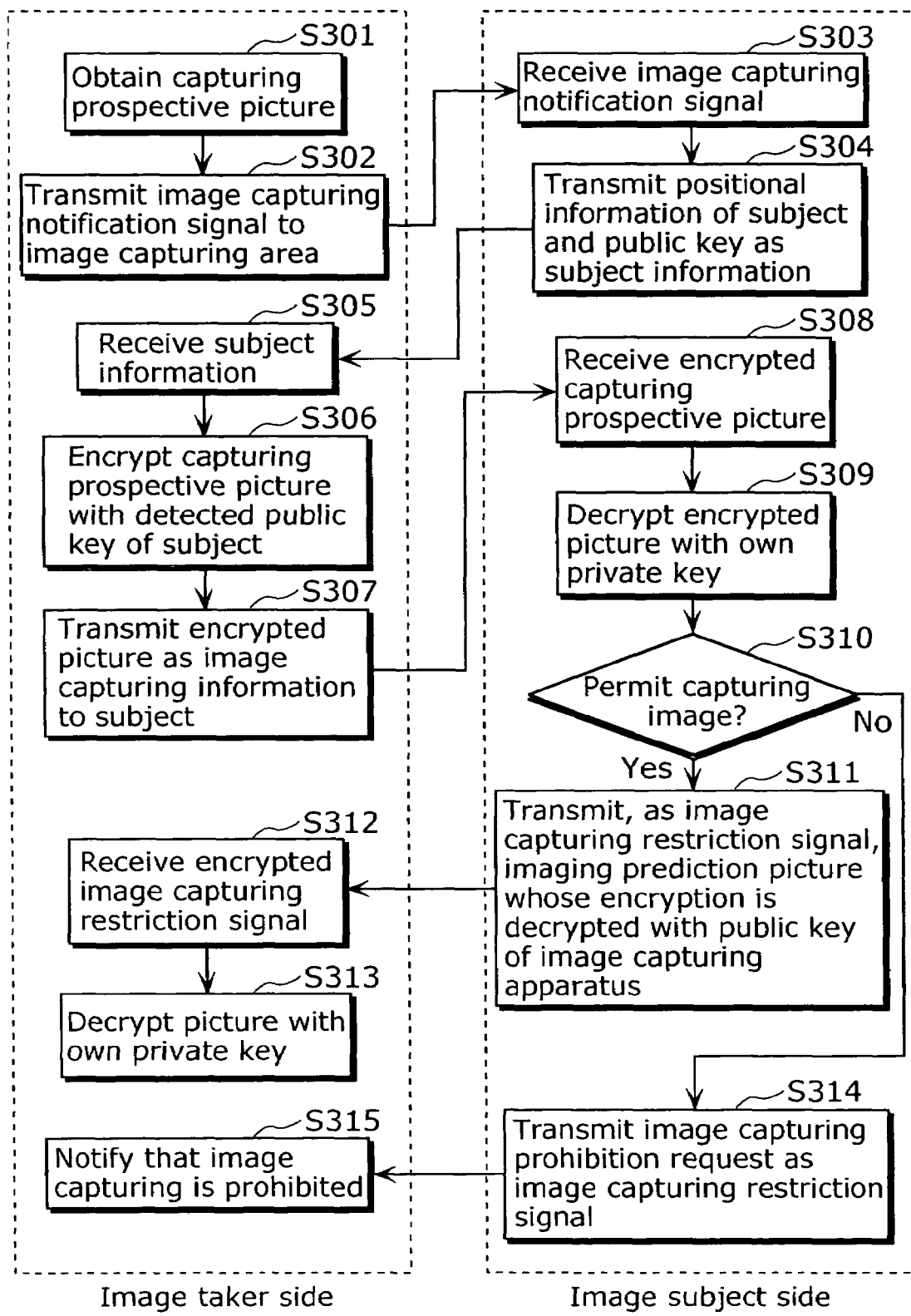
FIG. 16 is a flowchart showing a flow of operations in an image capturing system according to the third embodiment.

FIG. 16 is a flowchart showing a processing using the public key encryption method.

First, the image capturing unit 101 obtains a capturing prospective picture to be captured (step S301). The image capturing notification signal generation unit 104 transmits an image capturing notification signal for notifying a subject in an image capturing area that an image of the subject is being captured (step S302). As described in the above, by setting the image capturing area identical to a transmission area of the image capturing notification signal, the image capturing notification signal is transmitted only to the subject found in the image capturing area. Herein, by attaching, to the image capturing notification signal, image taker information such as a telephone number that is a method of accessing to an image taker, a communication between the image capturing apparatus 100 and the communication terminal 200 of the subject in the following processing may be performed by one-on-one communication using the telephone number.

Here, the method of accessing to an image taker is not only limited to a telephone number, for example, an e-mail address, an IP address, and the like may be used. Further, in order to prevent a fraud of a signal transmitted from the communication terminal 200 to the image capturing apparatus 100, it is desired to transmit the public key of the image capturing apparatus 100 as well. Furthermore, instead of transmitting the public key itself by the image capturing apparatus 100, the image capturing apparatus may transmit ID information of the image capturing apparatus and a signal indicating ID information of the public key used by the image capturing apparatus 100. The communication terminal 200 at the subject side may then obtain the public key corresponding to the ID information using the Internet and the like.

The image capturing notification signal receiving unit 202 of the communication terminal 200 receives the image capturing notification signal transmitted from the image capturing apparatus 100 (step S303). When receiving the image capturing notification signal, the subject information generation unit 203 transmits positional information of the communication terminal 200 and a public key to be used for communication hereafter as subject information (step S304). Here, as similar to the image capturing notification signal at the step S302, the method of accessing to a subject is attached to the subject information, and the communication between the image capturing apparatus 100 and the subject may be performed using the access method. Further, instead of the public key, the communication terminal 200 transmits the ID information of the subject and the ID information of the public key used by the subject. The image capturing apparatus 100 may then obtain the public key corresponding to the ID information using the Internet.

Further, it is desired for the subject information generation unit 203 to encrypt the subject information to be transmitted using the public key of the image capturing apparatus 100 received by the image capturing notification signal receiving unit 202. With such encryption, the fraud by the communication terminal 200 whose image is not captured can be prevented. This is explained later.

Next, the subject information receiving unit 105 of the image capturing apparatus 100 receives subject information transmitted from the communication terminal 200 (step S305). When receiving the subject information, the image capturing information generation unit 106 encrypts the capturing-prospective picture with the public key of the communication terminal 200 (step S306). Herein, the image capturing apparatus 100 cannot hold the capturing prospective picture before an encryption on a memory. Thus, such encrypted capturing prospective picture can be decrypted only by the subject having the private key corresponding to the public key used for the encryption. That is, the image taker cannot obtain the decrypted capturing prospective picture unless the subject decrypts the encryption. Note that, it is desired to change such encryption every time when an image capturing is performed.

The image capturing information generation unit 106 transmits such encrypted capturing prospective picture to the subject corresponding to the public key which is used for the encryption as image capturing information (step S307). Since the capturing prospective picture is encrypted with the public key of the subject, the capturing prospective picture cannot be encrypted and seen even when the receiving unit held by someone other than the subject receives the capturing prospective picture. Therefore, the eavesdropping of the capturing prospective picture can be prevented.

The image capturing information receiving unit 204 of the communication terminal 200 receives the encrypted capturing prospective picture (step S308). The image capturing information receiving unit 204 decrypts the encrypted capturing prospective picture with own private key, and obtains the capturing prospective picture (step S309).

The image capturing information receiving unit 204 checks the decrypted capturing prospective picture, and judges whether or not the picture is allowed for an image capturing (step S310). This judgment can be made by the subject by actually viewing the picture. Also, detecting whether or not own picture is included using an image feature as shown in the first embodiment, when the detection cannot be made, the judgment can be made so as to allow an image capturing because it cannot be judged whether the subject itself is in the picture from the image.

As the result of the judgment, if the subject allows an image capturing (Yes at step S310), the image capturing restriction signal generation unit 201 encrypts again, with the public key of the image taker, the capturing prospective picture decrypted with own private key, and transmits to the image taker as an image capturing restriction signal (step S311).

The image capturing restriction signal receiving unit 102 of the image capturing apparatus 100 receives the image capturing restriction signal transmitted from the communication terminal 200 (step S312). The image capturing restriction signal receiving unit 102 obtains a captured picture for the first time by decrypting, with own (image taker's) private key, the capturing prospective picture encrypted with the public key of the image taker included in the image capturing restriction signal (step S313). This capturing prospective picture is encrypted with the public key of the image taker so that the picture cannot be viewed even if the picture is received by the receiving unit other than the image taker. Therefore, the eavesdropping of the capturing-prospective picture can be prevented. Note that, it is possible to attach an access method to the subject attached to the subject information and the like, to such obtained captured picture as subject data, and to store the subject data.

On the other hand, as the result of the judgment, when the subject prohibits the image capturing (No at step S310), the image capturing restriction signal generation unit 201 transmits the restriction information requesting "photographing prohibition" as the image capturing restriction signal to the image capturing apparatus 100 (step S314).

The image capturing restriction signal receiving unit 102 of the image capturing apparatus 100 receives the image capturing restriction signal transmitted from the communication terminal 200. The image capturing restriction unit 103, as similar in the first embodiment, restricts or prohibits the image capturing based on the request, and notifies the image taker of the restriction or the prohibition (step 315).

Further, it is desired for the image capturing restriction signal generation unit 201 to encrypt an image capturing restriction signal to be transmitted with the public key of the image capturing apparatus 100 received by the image capturing notification signal receiving unit 202. With this encryption, the fraud by the communication terminal 200 whose image is not captured can be prevented.

Next, it is explained about the prevention of the fraud by the communication terminal 200 which is not found in the image capturing area of the image capturing apparatus 100 with reference to a diagram.

Figure 17:
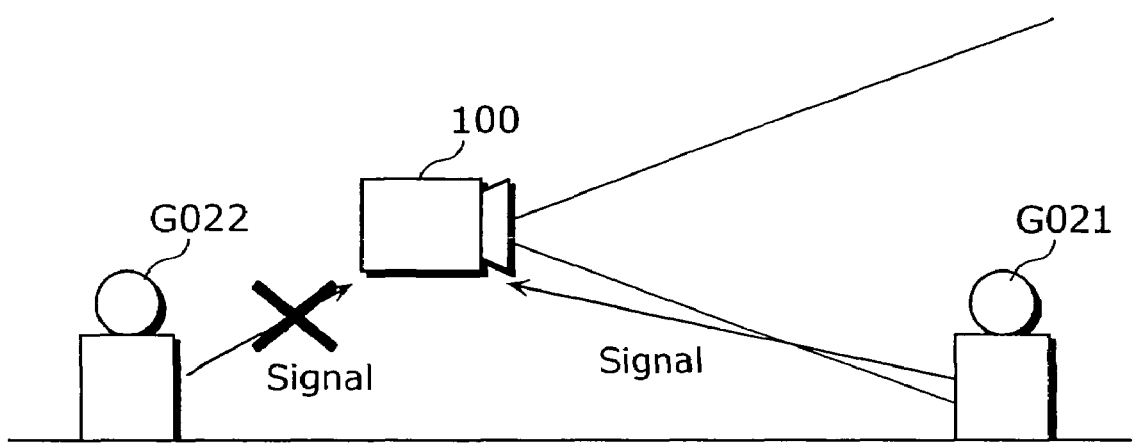
FIG. 17 is a schematic diagram for explaining a method for preventing an image capturing interference by a communication terminal that is not found in an image capturing area in the third embodiment.

FIG. 17 is a schematic diagram for explaining a method of preventing the fraud. Here, it indicates a state where the image capturing apparatus 100 is about to capture an image of the subject G021 having the communication terminal 200. Herein, the subject G022 which is not in the image capturing area is transmitting an image capturing restriction signal for requesting "photographing prohibition" in order to prevent the image capturing. However, the subject G022 is not found in the image capturing area of the image capturing apparatus 100 so that the image capturing apparatus 100 cannot receive the image capturing notification signal to be transmitted and the public key of the image capturing apparatus 100 cannot be obtained. The image capturing restriction signal transmitted by the subject G021 is encrypted with the public key of the image capturing apparatus 100 so that the image capturing apparatus 100 can decrypt the encryption with its own private key. On the other hand, the image capturing restriction signal transmitted by the subject G022 is not encrypted with the public key of the image capturing apparatus 100 so that the image capturing apparatus 100 cannot perform decryption even using its own private key. Therefore, the fraud by the communication terminal 200 outside the image capturing area can be prevented.

Also, in the case where there is a plurality of subjects in the image capturing area, when encrypting a capturing prospective picture at the step S306, each region where each subject is captured on the picture may be encrypted respectively with a public key of each subject.

Hereafter, it is explained about such case with references to a diagram.

Figure 18A:
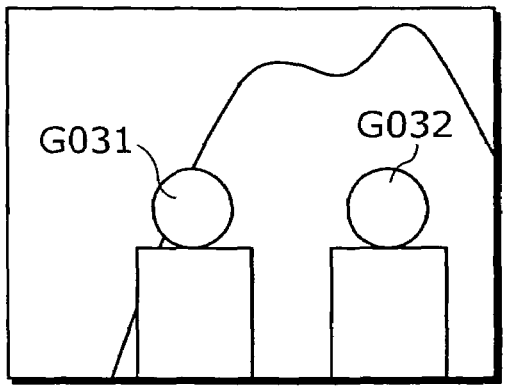
FIG. 18 is a schematic diagram, in the third embodiment, for explaining a processing in the case where there is a plurality of subjects.
Figure 18B:
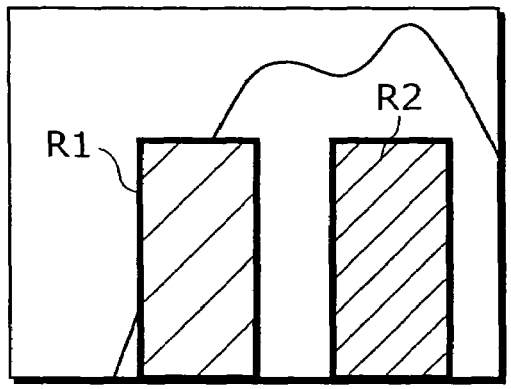
Figure 18C:
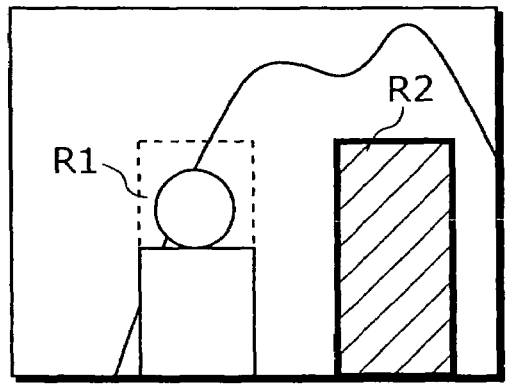
Figure 18D:
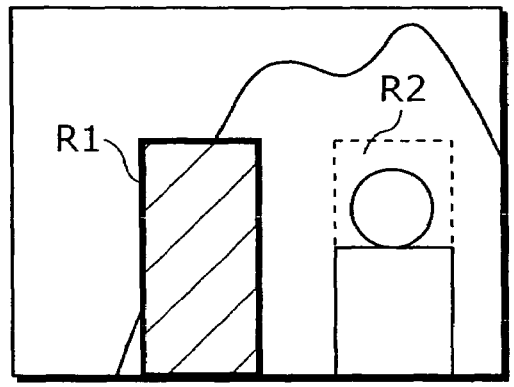
Figure 18E:
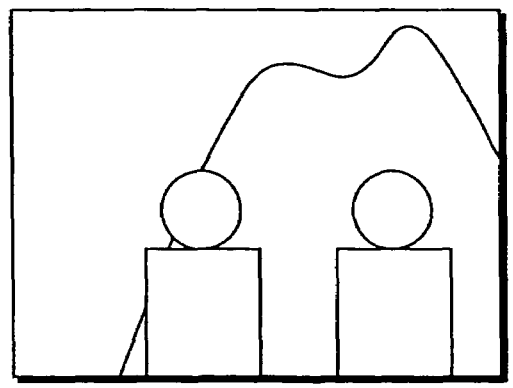

FIGS. 18A-18E are schematic diagrams for explaining a processing in the case where there are two subjects. FIG. 18A indicates a capturing prospective picture which is expected to be captured by the image capturing unit 101 in the case where the image capturing restriction unit 103 does not perform any processing, that is, in the case where there is no subject generating an image capturing restriction signal. FIG. 18B indicates an encrypted capturing prospective picture. FIG. 18C indicates a picture decrypted by the subject G031. FIG. 18D indicates a picture decrypted by the subject G032. FIG. 18E indicates a captured picture.

The image capturing apparatus 100 recognizes that there are subjects G031 and G032 on the picture through the processing (step S302 to step S305), and encrypts the picture (step S306). Herein, the image capturing information generation unit 106, as shown in FIG. 18B, encrypts respectively a region R1 including the subject G031 using a public key of the subject G031, and a region R2 including the subject G032 using a public key of the subject G032.

The encrypted picture is transmitted to the subject G031 and the subject G032, and decrypted with respective private keys of the subjects (step S307 to step S309). Herein, the subject G031 decrypts the transmitted encrypted picture using a private key of the subject G031 so that the region R1 encrypted with the public key of the subject G031 can be decrypted while the region R1 encrypted with the public key of the subject G032 cannot be decrypted. Therefore, as shown in FIG. 18C, a picture in which the subject G031 is shown while the region R2 including the subject G032 has been encrypted. On the other hand, the subject G032 is decrypted with a private key of the subject G032 so that, as shown in FIG. 18D, a picture in which the subject G032 is shown while the region R1 including the subject G031 is encrypted. In the case where both of the subject G031 and the subject G032 allow the image capturing, the image capturing apparatus 100 can obtain both pictures shown in FIGS. 18C and 18D. As the result, as shown in FIG. 18E, a captured picture which is completely decrypted is obtained. Also, in the case where only the subject G031 allows an image capturing and the subject G032 does not allow the image capturing, the captured picture is obtained as shown in FIG. 18C.

Here, each subject region is cut out and only the cut picture may be transmitted to a respective subject. That is, instead of transmitting the whole capturing prospective picture, the image in the region R1 as shown in FIG. 18B only is transmitted to the subject G031 and the image of the region R2 only is transmitted to the subject G032.

As described in the above, also in the case where there is a plurality of subjects, an image capturing for protecting privacy of the respective subject is allowed. Note that, such encryption is not limited to the public key cryptographic method. For example, a common key cryptographic method, quantum cryptography and the like can be used.

Also, in the present embodiment, the image capturing apparatus 100 and the communication terminal 200 directly communicate data with each other. However, the communication may be performed via a server.

Further, a picture captured as described in the above, image taker information, subject information and image capturing position may be stored in the server. The image capturing apparatus 100 and the communication terminal 200 exchange data through communication. Therefore, it is easily performed, other than by the image capturing apparatus 100 and the communication terminal 200, for example, by encrypting data using a public key of the server and transmitting the encrypted data to the server.

Such stored picture can be used, for example, as a background picture for interpolating the captured picture as described in the first embodiment and in the first variation. Also, it can be used for a criminal investigation and the like since it can be logged about in which region, when and what photograph is taken.

As explained in the above, in the present embodiment, when an image capturing is performed, the image capturing apparatus 100 checks with the communication terminal 200 on the subject side that is expected to be included in the captured picture about whether an image capturing is allowed. It restricts the captured picture according to whether or not the communication terminal 200 on the subject side allows the image capturing. Therefore, privacy of the subject is protected and the authorized image capturing can be prevented. Furthermore, the image capturing apparatus 100 can perform an image capturing without generating sounds and light so that it can prevent to bother neighbors when the image capturing is authorized.

Note that, each of the embodiments is explained as an image capturing system. However, it is not realized only as a system. It may be certainly realized as the image capturing apparatus 100 and the communication terminal 200.

Also, while, in each of the embodiments, a case of taking a still picture is explained, it can be similarly realized for the case of a moving picture. In the case of taking a moving picture, for example, judgments concerning the followings are made when a moving picture is taken: whether or not an image capturing restriction signal has been received; whether or not the image capturing is restricted in accordance with a request of the image capturing restriction signal; what types of restrictions are performed; and the like. While continuously taking the moving picture (while pressing the image capturing button), the image capturing can be performed in accordance with the result of the judgment, that is the result of the judgment made at the start and held.

Further, while continuously taking the moving picture as described in the above, not following the judgment result at the time of start, the image capturing is performed in accordance with the judgment results at the time of start only for a predetermined time, and a judgment can be made again after the predetermined period of time. In this case, the judgment is made every predetermined period of time, and the image capturing is performed in accordance with the judgment result herein.

Furthermore, while the subject is found in the captured picture, an image capturing can be performed following the judgment result which is the result of judgment obtained at the start and held. Also, detecting that the subject that transmits the image capturing restriction signal has entered the captured picture, the judgment can be made when it is detected.

Figure 19:
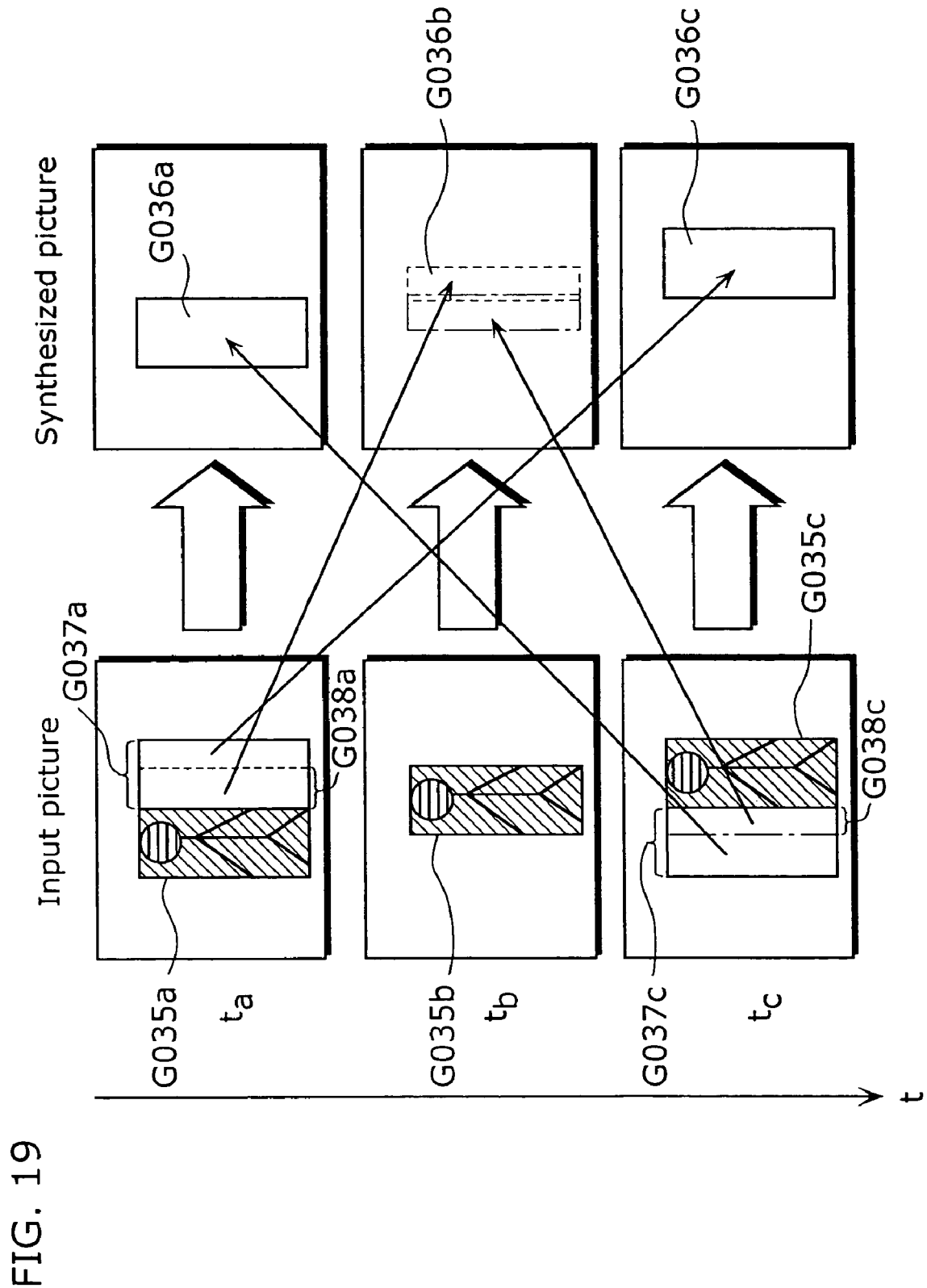
FIG. 19 is a schematic diagram for explaining a processing of generating, using time-series data of a moving picture, a replacement image in a capturing-prohibited area when the moving picture is captured.

Also, for taking a moving picture, in the case where the restriction information of the image capturing restriction signal is "this subject only is prohibited for photographing" and it is processed so that a region in which the subject is found cannot be captured as a capturing-prohibited region, a picture in the capturing-prohibited region can be created using time-series data of the moving picture. For example, as shown in FIG. 19, in the case where the region G035a to G035c where the subject which moves from left to right in the captured picture are the capturing-prohibited regions, the picture G036a which is equivalent to the region G035a in time $t_a$ using a picture of the region G037c in time $t_c$. At the same time, the picture G036b which is equivalent to the region G035b in time $t_b$ is created using pictures of the region G038a in time $t_a$ and the region G038c in time $t_c$. Also, the picture G036c which is equivalent to the region G035c in time $t_c$ is created using the picture of the region G037a in the time $t_a$. More natural moving picture can be created by creating and synthesizing a picture of the image capturing-prohibited region using time-series data of the captured moving picture.

Thus, the image capturing system is an image capturing system having an image capturing apparatus and a communication terminal which communicates with the image capturing apparatus. The communication terminal has an image capturing restriction signal generation unit which transmits an image capturing restriction signal for restricting the image capturing performed by the image capturing apparatus. The image capturing apparatus captures a moving picture, and has an image capturing restriction signal receiving unit which receives the image capturing restriction signal transmitted by the image capturing restriction signal generation unit and an image capturing restriction unit which restricts an image capturing based on the image capturing restriction signal received by the image capturing restriction signal receiving unit. The image capturing restriction signal is a signal for requesting not to take an image of a subject carrying the communication terminal. The image capturing restriction unit replaces a subject region in the captured picture with an image based on at least one of a time-series picture which has been captured and a time-series picture which is going to be captured in the case where the image capturing restriction signal is the signal for requesting not to take a picture of the subject carrying the communication terminal.

Fourth Embodiment

In each of the embodiments, in respect of image capturing, it is explained about a system which prevents capturing an image of a subject without permission. However, in respect of recording, there is a problem that, similar to the case of the image capturing, voice of a speaker is recorded without permission. Accordingly, in the present embodiment, it is explained about a recording system which can prevent voice of the speaker from being recorded without permission.

Figure 20:
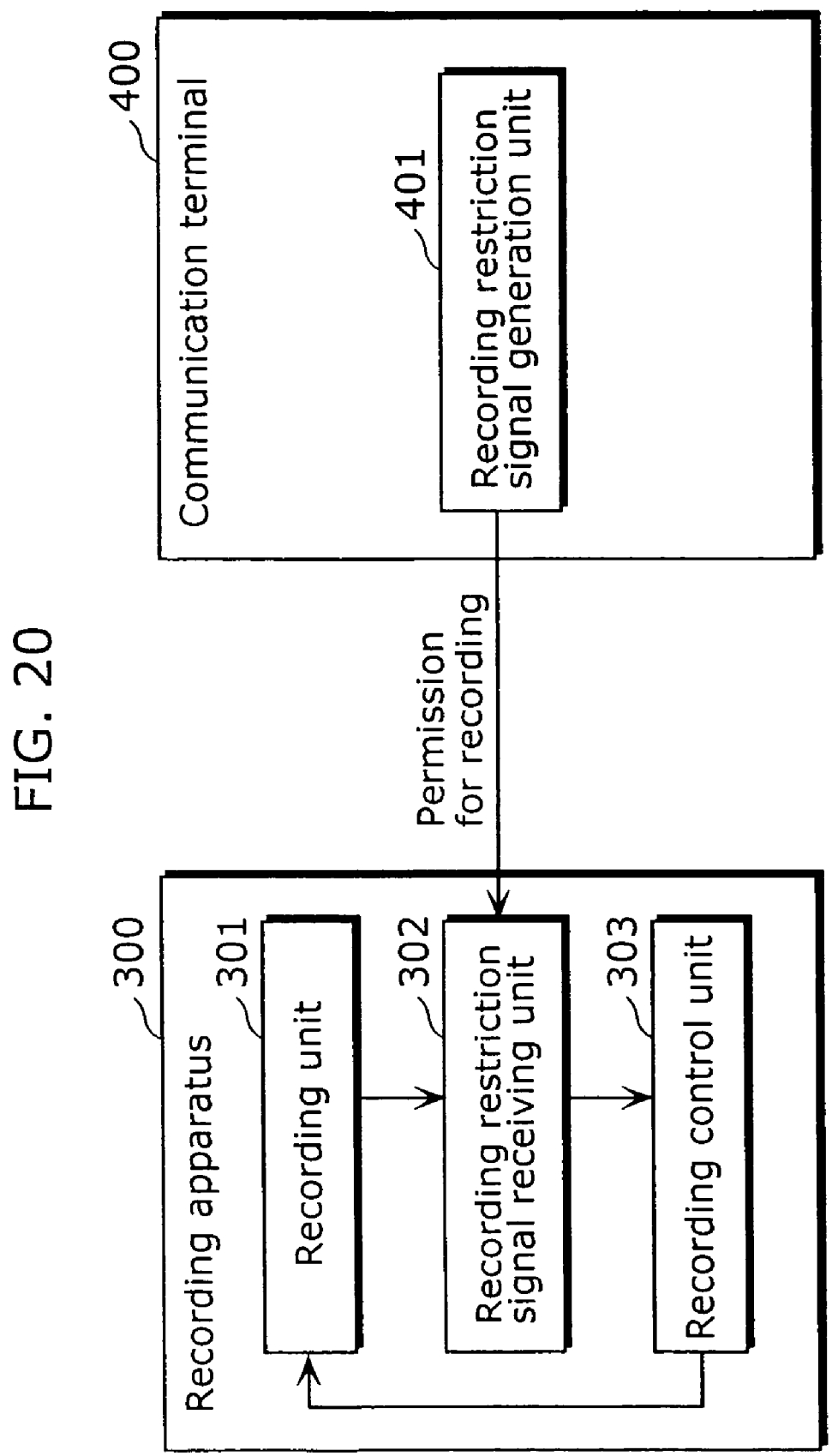
FIG. 20 is a block diagram showing a structure of a recording system according to a fourth embodiment of the present invention.

FIG. 20 is a block diagram showing a structure of a recording system according to the fourth embodiment of the present invention.

The recording system is a system for giving a recording apparatus which is going to perform recording a restriction on recording. As shown in FIG. 20, it broadly has a recording apparatus 300 at a recording side and a communication terminal 400 at a speaker side. Note that, hereafter, it is explained that the speaker side is a person and the speaker carries the communication terminal 400.

As shown in FIG. 20, the recording apparatus 300 has a recording unit 301, a recording restriction signal receiving unit 302, and a recording restriction unit 303.

The recording unit 301 has, for example, a directional microphone, and records sounds inputted from the directional microphone. The recording restriction signal receiving unit 302 detects, in the case where the recording apparatus 300 performs recording, whether or not the recording restriction signal transmitted by the communication terminal 400 of the speaker is found around the recording apparatus 300. In the case where there is a recording restriction signal, it receives the signal. Here, the start of recording can be detected by that a recording button is pressed. The recording restriction unit 303 thus performs recording after that the recording restriction signal receiving unit 302 has given a restriction on recording by the recording unit 301 according to a request of the recording restriction signal received by the recording restriction signal receiving unit 302.

As the recording apparatus 300, for example, not to mention an IC record, a still camera having a recording function, a digital video camera and the like, an apparatus only needs to have a recording function to be a recording unit 301 such as a cellular phone, a PDA, a laptop computer and a wearable terminal.

On the other hand, the communication terminal 400 has a recording restriction signal generation unit 401 as shown in FIG. 20. As the communication terminal 400, a recording restriction signal generation unit 401 only needs to be equipped to, for example, a mobile terminal, a key chain, and a watch.

The recording restriction signal generation unit 401 transmits a recording restriction signal for requesting to give a restriction on recording. Specifically, in order to request the recording apparatus which is going to perform recording to restrict the recording, similar to the case of the image capturing restriction signal in the first embodiment, the recording restriction signal generation unit 401 transmits following two types of information as recording signals using radio wave in a band, for example, infrared radiation and the like. The first information is restriction information for notifying details of restriction on recording. The second information is speaker information for the recording apparatus 300 to judge whether there is a speaker carrying the communication terminal 400 in a recording range. Here, the restriction information of the recording restriction signal are, for example, information such as "recording prohibited", "this speaker only is prohibited for recording", and "this speaker only is allowed for recording if the voice is converted".

Further, the restriction information of the recording restriction signal indicates that "this speaker only is allowed for recording if the voice is converted", the recording restriction unit 303 converts the voice of the speaker and records the voice in a format so that it cannot be judged as real voice of the subject.

The first and third examples in the first embodiment can be similarly applied to the operations of the recording system structured as described in the above. Therefore, the detailed explanations are omitted here. Note that, a recording range to be recorded by the recording unit 301 can be calculated by obtaining recording information by the recording unit 301 such as a direction of a directional microphone, a directional angle and sensitivity of the recording unit 301.

Figure 21:
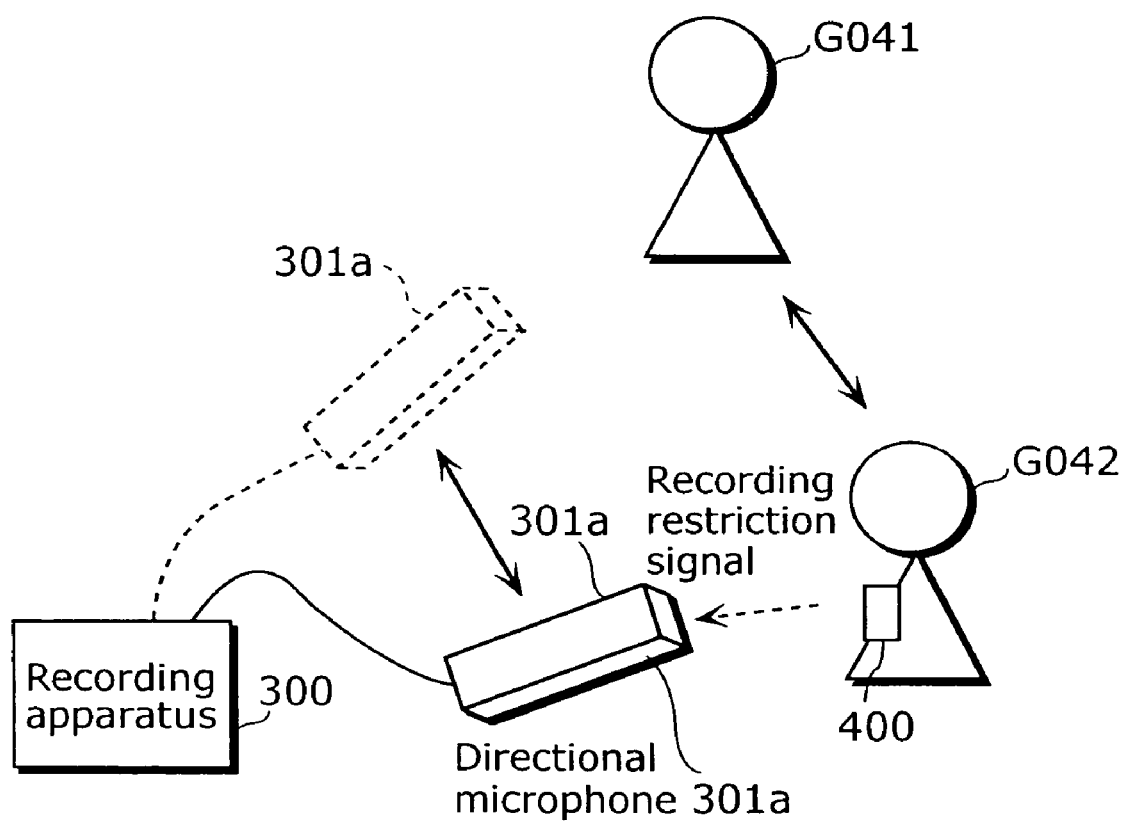
FIG. 21 is a schematic diagram showing a state in which a dialogue between a subject to be recorded without having a communication terminal and a subject to be recorded having a communication terminal is recorded by a recording apparatus.

FIG. 21 is a schematic diagram showing a state where an interview between a speaker G041 without communication terminal and a speaker G042 having a communication terminal 400 is recorded by the recording apparatus 300.

Here, assuming an interview between an announcer (speaker G041) and a user (speaker G042) who does not want to his/her privacy to be invaded, it shows a case where, while the voice of the announcer is recorded as it is, the voice of the user is restricted (converted) and recorded.

The communication terminal 400 held by a user transmits a recording restriction signal indicating that "this speaker only is allowed for recording if the voice is converted".

The recording restriction unit 303 of the recording apparatus 300, in the case of pointing the directional microphone 301a of the recording unit 301 toward the speaker G041, records the voice as it is since the transmission source of the recording restriction signal is outside the recording range. On the other hand, the recording restriction unit 303, in the case of pointing the directional microphone 301a toward the speaker G042, converts and records the voice since the transmission source of the recording restriction signal is within the recording range.

Furthermore, for example, if the announcer does not have a communication terminal and the stuff has a communication terminal 400 which transmits a recording restriction signal of the restriction information indicating that "this speaker only is prohibited for recording", only the voice of the announcer is recorded without recording the voice of the stuff.

Thus, it can be used for the case where it is necessary to record by converting only the voice of a predetermined person in a plurality of speakers, and the case where it is necessary to record only the voice of the predetermined person in the plurality of speakers and not to record the voices of other speakers.

Figure 22:
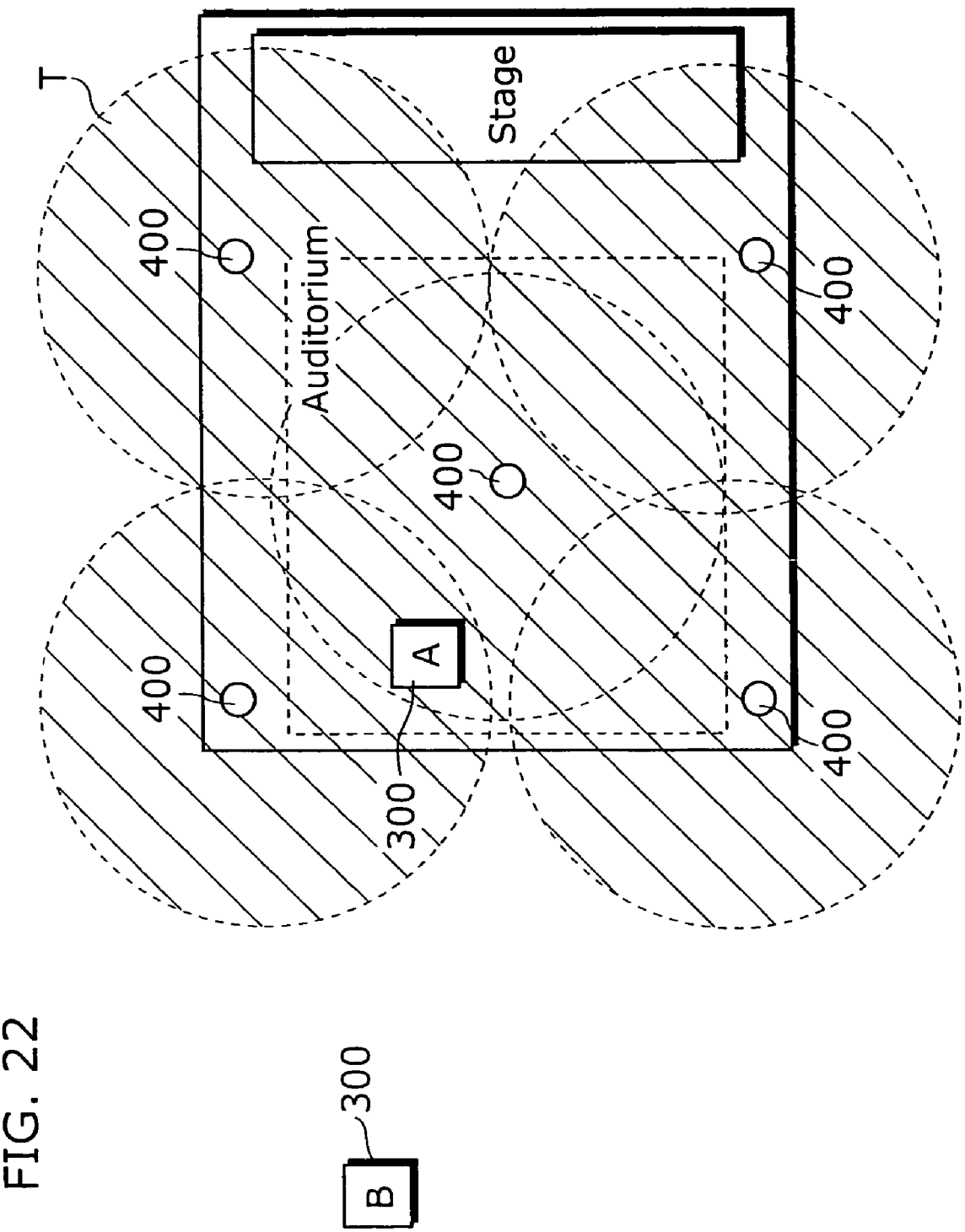
FIG. 22 is a schematic diagram showing a state in which recording is restricted at a concert venue.

Next, it is explained about a case where the recording system of the present invention is applied for restricting recording at a concert venue. FIG. 22 is a schematic diagram showing a state where recording is restricted at a concert venue.

The communication terminal 400 set in a concert venue transmits the recording restriction signal whose restriction information indicates "recording prohibited". Accordingly, as shown in FIG. 22, in a region T to which the recording restriction signal transmitted from the communication terminal 400 is reached, the recording apparatus 300 cannot perform recording. Thus, while the recording apparatus 300 can perform recording at a position B, the recording apparatus 300 cannot perform recording at a position A.

Thus, it is possible to restrict recording in the concert venue by setting the communication terminal 400 which transmits the recording restriction signal whose restriction information indicates "recording prohibited", at the concert venue.

Accordingly, the recording system is a recording system having a recording apparatus and a communication terminal which communicates with the recording apparatus. The communication terminal has a recording restriction signal generation unit which transmits a recording restriction signal for restricting recording by the recording apparatus. The recording apparatus has a recording restriction signal receiving unit which receives the recording restriction signal transmitted by the recording restriction signal generation unit and a recording restriction unit which restricts recording based on the recording restriction signal received by the recording restriction signal receiving unit.

Consequently, the recording apparatus verifies whether or not the communication terminal of the speaker side has allowed recording when the recording is performed, and can perform recording only under a condition which the communication terminal of the speaker side allows recording. Therefore, it can prevent eavesdropping.

Note that, in each of the embodiments, concerning taking a still picture and a moving picture, it is explained about a system for preventing an image of the subject from being captured without permission, and a recording system, concerning recording, which can prevent the voice of the speaker from being recorded without permission. However, they are not limited for an independent use.

For example, in a combination of a still picture taking, a moving picture taking, and a voice recording, the communication terminal may transmit a restriction signal which allows a voice recording while not allowing taking the still picture and the moving picture. Also, the communication terminal may transmit a restriction signal and the like which allow taking an image with low-resolution while not allow taking an image with high-resolution.

With the structure, in accordance with needs of image subjects and speakers, privacies of the image subjects and the speakers are protected and the eavesdropping and unauthorized image capturing can be prevented.

Furthermore, in the case of combining a still picture taking, a moving picture taking, and a voice recording, for example, communication terminals which have different restriction details (converting voice, generating mosaic on a face, etc) are prepared for interviews by broadcasting agencies and the like, the interviewers can perform image capturing and recording in accordance with agreed restrictions only by carrying a communication terminal in accordance with an interviewee's wish.

Further, an image capturing method according to the present invention is an image capturing method for use in an image capturing system including an image capturing apparatus and a communication terminal which communicates with the image capturing apparatus, said method including the following steps to be executed by the image capturing apparatus: an image capturing notification signal generating step of transmitting an image capturing notification signal for notifying the communication terminal that an image capturing is to be performed; an image capturing restriction signal receiving step of receiving an image capturing restriction signal transmitted by the communication terminal; and an image capturing restricting step of restricting the image capturing based on the image capturing restriction signal received in the image capturing restriction signal receiving step, and the method including the following steps to be executed by the communication terminal: an image capturing notification signal receiving step of receiving the image capturing notification signal transmitted in the image capturing notification signal generating step; and an image capturing restriction signal generating step of transmitting the image capturing restriction signal for restricting the image capturing performed by the image capturing apparatus based on the image capturing notification signal received in the image capturing notification signal receiving step.

Also, the image capturing method further includes the following steps executed by the image capturing apparatus: a subject information receiving step of receiving subject information that is information about a subject to be captured, and that is transmitted by the communication terminal carried by the subject; and an image capturing information generating step of transmitting, to the communication terminal, image capturing information for judging whether or not the subject carrying the communication terminal allows the image capturing, based on the subject information received in the subject information receiving step, and the method further includes the following steps to be executed by the communication terminal: a subject information generating step of transmitting the subject information to the image capturing apparatus based on the image capturing notification signal received in the image capturing notification signal receiving step; and an image capturing information receiving step of receiving the image capturing information transmitted in the image capturing information generating step, wherein in the image capturing restriction signal generating step, the image capturing restriction signal is transmitted based on the image capturing information received in the image capturing information receiving step.

Furthermore, a program according to the present invention is a program for performing an image capturing for use in an image capturing system, the image capturing system including an image capturing apparatus and a communication terminal which communicates with the image capturing apparatus, the program causing a computer to execute the following: in the image capturing apparatus, an image capturing notification signal generating step of transmitting an image capturing notification signal for notifying the communication terminal that the image capturing is to be performed; an image capturing restriction signal receiving step of receiving an image capturing restriction signal transmitted by the communication terminal; an image capturing restricting step of restricting the image capturing based on the image capturing restriction signal received in the image capturing restriction signal receiving step; and in the communication terminal, an image capturing notification signal receiving step of receiving the image capturing notification signal transmitted in the image capturing notification signal generating step; and an image capturing restriction signal generating step of transmitting the image capturing restriction signal for restricting the image capturing performed by the image capturing apparatus based on the image capturing notification signal received in the image capturing notification signal receiving step.

The program causes the following steps: further in the image capturing apparatus, a subject information receiving step of receiving subject information that is information about a subject to be captured, and that is transmitted by the communication terminal carried by the subject; an image capturing information generating step of transmitting, to the communication terminal, image capturing information for judging whether or not the subject carrying the communication terminal allows the image capturing, based on the object information received in the subject information receiving step; and further in the communication terminal, a subject information generating step of transmitting, to the image capturing apparatus, the subject information based on the image capturing notification signal received in the image capturing notification signal receiving step; and an image capturing information receiving step of receiving the image capturing information transmitted in the image capturing information generating step, wherein, in the image capturing restriction signal generating step, the image capturing restriction signal is transmitted based on the image capturing information received in the image capturing information receiving step.

INDUSTRIAL APPLICABILITY

As described in the above, the image capturing system according to the present invention can protect privacy of a subject and prevent unauthorized image capturing, and useful for an image capturing system which capturers an image using an image capturing apparatus such as, for example, a digital still camera, a still camera, a video camera, and a camera-equipped cellular phone.

The invention claimed is:
1. An image capturing system comprising:
an image capturing apparatus; and
a communication terminal which communicates with said image capturing apparatus,
wherein said communication terminal is carried by a person that is a subject to be captured,
said image capturing apparatus includes:
an image capturing notification signal generation unit operable to transmit an image capturing notification signal for notifying said communication terminal that an image capturing is to be performed;

an image capturing restriction signal receiving unit operable to receive an image capturing restriction signal transmitted by said communication terminal; and an image capturing restriction unit operable to restrict the image capturing based on the image capturing restriction signal received by said image capturing restriction signal receiving unit, and said communication terminal includes:

an image capturing notification signal receiving unit operable to receive the image capturing notification signal transmitted by said image capturing notification signal generation unit; and an image capturing restriction signal generation unit operable to transmit the image capturing restriction signal for restricting the image capturing performed by said image capturing apparatus, based on the image capturing notification signal received by said image capturing notification signal receiving unit.

2. The image capturing system according to claim 1, wherein the image capturing notification signal includes image taker information for specifying an image taker, and said image capturing restriction signal generation unit is operable to judge whether or not to restrict the image capturing based on the image taker information, and to transmit the image capturing restriction signal based on the judgment.

3. The image capturing system according to claim 2, wherein the image taker information is identification (ID) information of the image taker, and said image capturing restriction signal generation unit is operable to judge whether or not to restrict the image capturing by comparing the ID information of the image taker with pre-registered ID information.

4. The image capturing system according to claim 2, wherein the image taker information is position or direction information of said image capturing apparatus, and said image capturing restriction signal generation unit is operable to notify the subject to be captured of the position or direction information of said image capturing apparatus.

5. The image capturing system according to claim 1, wherein said image capturing restriction unit is operable to perform one of the following: deleting a subject region in a captured picture; and replacing the subject region with another image based on the image capturing restriction signal received by said image capturing restriction signal receiving unit.

6. The image capturing system according to claim 1, wherein said image capturing restriction unit is operable to perform one of the following: deleting a background region in a captured picture; and replacing the background region with another image, based on the image capturing restriction signal received by said image capturing restriction signal receiving unit.

7. The image capturing system according to claim 1, wherein said image capturing restriction signal receiving unit is operable to estimate a position of the subject to be captured based on the image capturing restriction signal.

8. An image capturing system comprising:

an image capturing apparatus; and a communication terminal which communicates with said image capturing apparatus, wherein said image capturing apparatus includes:

an image capturing notification signal generation unit operable to transmit an image capturing notification signal for notifying said communication terminal that an image capturing is to be performed;

an image capturing restriction signal receiving unit operable to receive an image capturing restriction signal transmitted by said communication terminal;

an image capturing restriction unit operable to restrict the image capturing based on the image capturing restriction signal received by said image capturing restriction signal receiving unit;

a subject information receiving unit operable to receive subject information that is information about a subject to be captured, and that is transmitted by said communication terminal carried by the subject; and an image capturing information generation unit operable to transmit, to said communication terminal, image capturing information for judging whether or not the subject carrying said communication terminal allows the image capturing, based on the subject information received by said subject information receiving unit, said communication terminal includes:

an image capturing notification signal receiving unit operable to receive the image capturing notification signal transmitted by said image capturing notification signal generation unit;

an image capturing restriction signal generation unit operable to transmit the image capturing restriction signal for restricting the image capturing performed by said image capturing apparatus, based on the image capturing notification signal received by said image capturing notification signal receiving unit;

a subject information generation unit operable to transmit the subject information to said image capturing apparatus based on the image capturing notification signal received by said image capturing notification signal receiving unit; and an image capturing information receiving unit operable to receive the image capturing information transmitted by said image capturing information generation unit, and said image capturing restriction signal generation unit is operable to transmit the image capturing restriction signal based on the image capturing information received by said image capturing information receiving unit.

9. The image capturing system according to claim 8, wherein said image capturing information generation unit is operable to transmit a capturing prospective picture which is likely to be captured as image capturing information.

10. The image capturing system according to claim 9, wherein said subject information generation unit is operable to transmit information for encrypting the image capturing information as subject information, and said image capturing information generation unit is operable to encrypt the capturing prospective picture based on the information for encryption.

11. An image capturing system comprising:

an image capturing apparatus; and a communication terminal which communicates with said image capturing apparatus, wherein said communication terminal includes an image capturing restriction signal generation unit operable to attach information relating to a subject to be captured to an image capturing restriction signal for restricting an image capturing performed by said image capturing apparatus, and to transmit the image capturing restriction signal attached with the information, the subject carrying said communication terminal, and said image capturing apparatus includes:

an image capturing restriction signal receiving unit operable to receive the image capturing restriction signal transmitted by said image capturing restriction signal generation unit; and an image capturing restriction unit operable to judge whether or not the subject carrying said communication terminal is included in an image capturing area of said image capturing apparatus based on the information attached to the image capturing restriction signal received by said image capturing restriction signal receiving unit, and to restrict the image capturing based on the image capturing restriction signal in the case where the subject is included in the image capturing area.

12. The image capturing system according to claim 11, wherein the information attached to the image capturing restriction signal is position information indicating a position of said communication terminal, and said image capturing restriction unit is operable to judge whether or not the subject carrying said communication terminal is included in the image capturing area of said image capturing apparatus by comparing the position of said communication terminal with the image capturing area of said image capturing apparatus, and to restrict the image capturing based on the image capturing restriction signal in the case where the subject is included in the image capturing area.

13. The image capturing system according to claim 11, wherein the information attached to the image capturing restriction signal is image feature information indicating a feature of the subject carrying said communication terminal, and said image capturing restriction unit is operable to judge whether or not the subject carrying said communication terminal is included in the image capturing area of said image capturing apparatus by comparing the feature of the subject based on the image feature information with an capturing prospective picture which is likely to be captured, and to restrict the image capturing based on the image capturing restriction signal in the case where the subject is included in the image capturing area.

14. An image capturing apparatus comprising:

an image capturing notification signal generation unit operable to transmit an image capturing notification signal for notifying another apparatus that an image capturing is to be performed;

an image capturing restriction signal receiving unit operable to receive an image capturing restriction signal for restricting the image capturing, the image capturing restriction signal being transmitted by the another apparatus; and an image capturing restriction unit operable to restrict the image capturing based on the image capturing restriction signal received by said image capturing restriction signal receiving unit, wherein the another apparatus is carried by a person that is a subject to be captured.

15. An image capturing apparatus comprising:

an image capturing notification signal generation unit operable to transmit an image capturing notification signal for notifying another apparatus that an image capturing is to be performed;

an image capturing restriction signal receiving unit operable to. receive an image capturing restriction signal for restricting the image capturing, the image capturing restriction signal being transmitted by the another apparatus;

an image capturing restriction unit operable to restrict the image capturing based on the image capturing restriction signal received by said image capturing restriction signal receiving unit;

a subject information receiving unit operable to receive subject information that is information about a subject to be captured and that is transmitted by the another apparatus carried by the subject; and an image capturing information generation unit operable to transmit, to the another apparatus, image capturing information for judging whether or not the subject carrying the another apparatus allows the image capturing based on the subject information received by said subject information receiving unit.

16. A communication terminal which communicates with an image capturing apparatus, said terminal comprising:

an image capturing notification signal receiving unit operable to receive an image capturing notification signal transmitted by the image capturing apparatus; and an image capturing restriction signal generation unit operable to transmit an image capturing restriction signal for restricting the image capturing performed by the image capturing apparatus based on the image capturing notification signal received by said image capturing notification signal receiving units, wherein said communication terminal is carried by a person that is a subject to be captured.

17. A communication terminal which communicates with an image capturing apparatus, said terminal comprising:

an image capturing notification signal receiving unit operable to receive an image capturing notification signal transmitted by the image capturing apparatus;

an image capturing restriction signal generation unit operable to transmit an image capturing restriction signal for restricting the image capturing performed by the image capturing apparatus based on the image capturing notification signal received by said image capturing notification signal receiving unit;

a subject information generation unit operable to transmit subject information to the image capturing apparatus based on the image capturing notification signal received by said image capturing notification signal receiving unit, the subject information being information about a subject to be captured, and the subject carrying said communication terminal; and an image capturing information receiving unit operable to receive image capturing information for judging whether or not the subject carrying said communication terminal allows the image capturing, the image capturing information being transmitted from the image capturing apparatus based on the subject information, wherein said image capturing restriction signal generation unit is operable to transmit the image capturing restriction signal based on the image capturing information received by said image capturing information receiving unit.

* * * * *

UNITED STATES PATENT AND TRADEMARK OFFICE
CERTIFICATE OF CORRECTION

| | | |
|---|---|---|
| PATENT NO. | : 7,570,283 B2 | Page 1 of 1 |
| APPLICATION NO. | : 11/247178 | |
| DATED | : August 4, 2009 | |
| INVENTOR(S) | : Satoshi Sato et al. | |

It is certified that error appears in the above-identified patent and that said Letters Patent is hereby corrected as shown below:

On the Title Page

In Section (56) References Cited, under the "FOREIGN PATENT DOCUMENTS" heading, "JP 20014-169175" should read --JP 2001-169175--.

Signed and Sealed this

Eighth Day of June, 2010

David J. Kappos
*Director of the United States Patent and Trademark Office*